(12) United States Patent
Xu et al.

(10) Patent No.: US 11,863,322 B2
(45) Date of Patent: Jan. 2, 2024

(54) COMMUNICATION METHOD AND APPARATUS

(71) Applicant: HUAWEI TECHNOLOGIES CO., LTD., Guangdong (CN)

(72) Inventors: Cong Xu, Beijing (CN); Haibo Zhang, Beijing (CN); Tingqiu Yuan, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/070,792

(22) Filed: Nov. 29, 2022

(65) Prior Publication Data

US 2023/0096063 A1 Mar. 30, 2023

Related U.S. Application Data

(63) Continuation of application No. PCT/CN2021/097002, filed on May 28, 2021.

(30) Foreign Application Priority Data

May 30, 2020 (CN) ......................... 202010480708.7

(51) Int. Cl.
*H04L 1/1607* (2023.01)
*H04L 1/00* (2006.01)

(52) U.S. Cl.
CPC .......... *H04L 1/1628* (2013.01); *H04L 1/0002* (2013.01)

(58) Field of Classification Search
CPC . H04L 1/1628; H04L 1/0002; H04L 45/7453; H04L 47/34; H04L 45/24; H04L 47/12; H04L 69/14; H04L 47/122; H04L 47/125; H04L 65/40; H04L 67/1001
USPC ......................................... 370/324, 329, 235
See application file for complete search history.

(56) References Cited

U.S. PATENT DOCUMENTS

| 8,111,649 | B1 | 2/2012 | Agarwall et al. |
| 2003/0128672 | A1* | 7/2003 | Komandur .............. H04L 47/10 370/324 |
| 2004/0185887 | A1* | 9/2004 | Wolman ................ H04W 92/18 455/516 |

(Continued)

FOREIGN PATENT DOCUMENTS

| CN | 103312607 A | 9/2013 |
| CN | 104038322 A | 9/2014 |

(Continued)

*Primary Examiner* — Kwang B Yao
*Assistant Examiner* — Syed M Bokhari
(74) *Attorney, Agent, or Firm* — WOMBLE BOND DICKINSON (US) LLP

(57) ABSTRACT

In an embodiment, a source node assigns a first number to a probe data packet in a probe data flow in a sending sequence, where the first number is used to select a transmission path for the probe data packet. The source node sends the probe data packet in the probe data flow to a destination node at a first sending rate. Each time the source node receives a probe data packet backhauled by the destination node, the source node sends a service data packet in a service data flow, where the service data packet is assigned a second number corresponding to the probe data packet, and the second number is used to select a transmission path for the service data packet.

11 Claims, 19 Drawing Sheets

(56) References Cited

U.S. PATENT DOCUMENTS

| | | | | |
|---|---|---|---|---|
| 2006/0031564 A1* | 2/2006 | Brassil | ................... | H04L 47/10 |
| | | | | 709/233 |
| 2007/0005804 A1* | 1/2007 | Rideout | ............. | H04L 65/1101 |
| | | | | 375/E7.181 |
| 2013/0301569 A1* | 11/2013 | Wang | ................... | H04L 5/0055 |
| | | | | 370/329 |
| 2015/0127797 A1 | 5/2015 | Attar et al. | | |
| 2016/0261492 A1* | 9/2016 | Xiao | ................. | H04L 41/0816 |
| 2017/0085485 A1 | 3/2017 | Vanini et al. | | |
| 2019/0190833 A1* | 6/2019 | Georgios | ............. | H04L 47/125 |
| 2019/0199647 A1* | 6/2019 | Gupta | ................... | H04L 45/74 |

FOREIGN PATENT DOCUMENTS

| | | |
|---|---|---|
| CN | 104618236 A | 5/2015 |
| CN | 105578553 A | 5/2016 |
| CN | 105681445 A | 6/2016 |
| CN | 106201356 A | 12/2016 |
| CN | 108390820 A | 8/2018 |
| CN | 108881008 A | 11/2018 |
| WO | 2019158106 A1 | 8/2019 |

\* cited by examiner

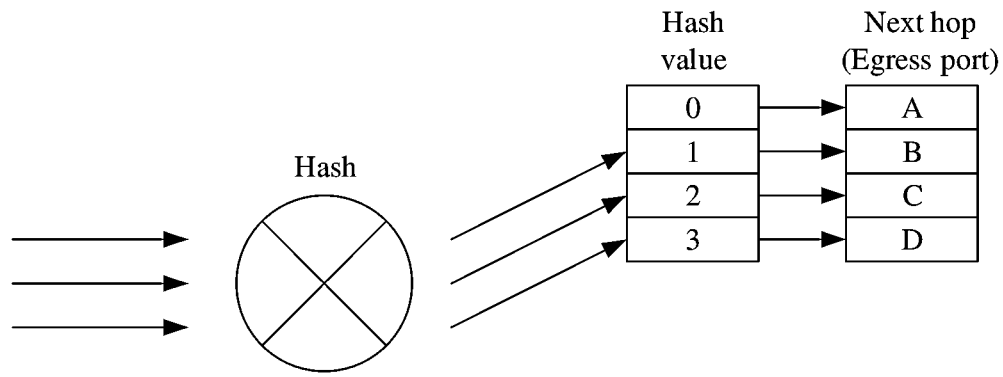
FIG. 4
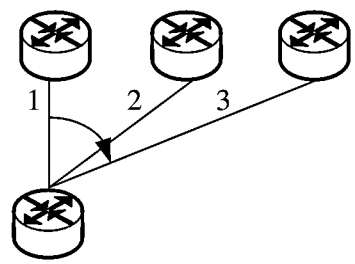
FIG. 5
| | | \multicolumn{4}{c}{Transmission path} |
| | | 0 | 1 | 2 | 3 |
|---|---|---|---|---|---|
| Node | L1 | 5 | 3 | 7 | 2 |
| | L2 | 1 | 1 | 5 | 4 |
Path status table (L0)
FIG. 6

(A)

(B)

COMMUNICATION METHOD AND APPARATUS

CROSS-REFERENCE TO RELATED APPLICATIONS

This application is a continuation of International Application No. PCT/CN2021/097002, filed on May 28, 2021, which claims priority to Chinese Patent Application No. 202010480708.7, filed on May 30, 2020. The disclosures of the aforementioned applications are hereby incorporated by reference in their entireties.

TECHNICAL FIELD

This disclosure relates to the field of communication technologies, and in particular, to a communication method and apparatus.

BACKGROUND

As cloud computing continuously develops, data center traffic has gradually evolved from conventional "north-south traffic" to "east-west traffic". This poses higher challenges to a network bandwidth and network performance. To adapt to a new traffic distribution feature of the cloud computing, a topology architecture of a data center network (DCN) undergoes evolution shown in FIG. 1. It may be learned from FIG. 1 that the data center network architecture has evolved from a tree network architecture solution (A) of transmission to a "fat-tree" network architecture solution (B). Different from the tree network architecture solution, in the fat-tree network architecture, there are a plurality of end-to-end transmission paths between any two edge switches. This implements end-to-end high-bandwidth and low-delay communication.

In addition to a data center scenario, as shown in FIG. 2, requirements for multipath transmission gradually increase in scenarios such as a wide area network and a metropolitan area network. Therefore, when there are a plurality of transmission paths for data transmission between a source node and a destination node, during the multipath transmission, how to properly distribute an amount of data transmitted on each transmission path becomes an important problem, to fully utilize bandwidth resources of transmission paths, avoid disorder of transmitted data, and implement optimal load sharing.

SUMMARY

Embodiments of this disclosure provide a communication method and apparatus, to properly distribute an amount of data transmitted on each transmission path during multipath transmission, fully utilize bandwidth resources of transmission paths, avoid disorder of transmitted data, and implement optimal load sharing.

According to a first aspect, this disclosure provides a communication method. In an embodiment, a source node assigns a first number to a probe data packet in a probe data flow in a sending sequence, where the first number is used to select a transmission path for the probe data packet. The source node sends the probe data packet in the probe data flow to a destination node at a first sending rate. Each time the source node receives a probe data packet backhauled by the destination node, the source node sends a service data packet in a service data flow, where the service data packet is assigned a second number corresponding to the probe data packet, and the second number is used to select a transmission path for the service data packet. When the first number is the same as the second number, the probe data packet to which the first number is assigned and the service data packet to which the second number is assigned correspond to a same transmission path. Optionally, the source node sends the probe data packet in the probe data flow to the destination node at the first sending rate in one or more transmission periods.

In the foregoing method, a new input variable (number) is introduced, so that different service data packets in a same data flow may be hashed to different transmission paths. This implements multipath packet-by-packet load sharing. In addition, a policy is adjusted based on a service data sending path for an arrival sequence of backhauled probe data packets, and load of a multipath link at a next moment is pre-determined by using a status of probe data packet pre-transmission. This can ensure that the service data packet may arrive at the destination node in sequence, resolve a most fatal data disorder problem in packet-by-packet load sharing, and implement optimal load sharing.

In an embodiment, the probe data packet backhauled by the destination node carries a number receiving sequence table, and the number receiving sequence table is used by the destination node to record, in a receiving sequence when the destination node receives the probe data packet, a first number of a probe data packet that has been received in a current period. Each time the source node receives a probe data packet backhauled by the destination node, the source node updates a probe data packet arrival sequence table based on the number receiving sequence table carried in the probe data packet backhauled by the destination node, where the probe data packet arrival sequence table records, based on a sequence in which a probe data packet arrives at the destination node, a first number of the probe data packet that has arrived at the destination node in the current period. In an embodiment, the second number is a first number that is determined by the source node in the probe data packet arrival sequence table based on an order of receiving probe data packets backhauled by the destination node in a current period and that is consistent with the order.

In the foregoing embodiment, information about an arrival sequence of forward probe data packets is introduced into a backhaul probe data packet, so that negative impact caused by transmission disorder of the backhaul probe data packet on path planning for the service data packet is effectively resolved. Even if disorder occurs in a backhaul probe data packet transmission process, the source node may still accurately restore an arrival sequence of the forward probe data packets from an out-of-order backhaul probe data packet, and perform correct path planning for service data packet transmission, to ensure that service data packets arrive at the destination node in sequence.

In an embodiment, the source node adjusts the first sending rate based on a packet loss rate of the probe data packet.

In the foregoing embodiment, the source node adjusts a probe data packet sending rate based on a packet loss rate of the probe data packet. This can effectively ensure that the probe data packet sending rate matches a transmission bandwidth, and avoid extra traffic and processing resource overheads.

In an embodiment, the probe data packet does not include a data domain (e.g., payload).

In the foregoing embodiment, the probe data packet does not include the data domain, so that traffic overheads caused by sending the probe data packet may be effectively reduced.

According to a second aspect, this disclosure provides a communication method. In an embodiment, a destination node updates a number receiving sequence table each time the destination node receives a probe data packet from a source node, where the number receiving sequence table is used to record, based on a receiving sequence, a first number of a probe data packet that has been received in a current period. The destination node backhauls the probe data packet to the source node, where the backhauled probe data packet carries the number receiving sequence table.

According to the foregoing embodiment, information about an arrival sequence of forward probe data packets is introduced into a backhaul probe data packet, so that negative impact caused by transmission disorder of the backhaul probe data packet on path planning for the service data packet is effectively resolved. Even if disorder occurs in a backhaul probe data packet transmission process, the source node may still accurately restore an arrival sequence of the forward probe data packets from an out-of-order backhaul probe data packet, and perform correct path planning for service data packet transmission, to ensure that service data packets arrive at the destination node in sequence.

In an embodiment, the probe data packet backhauled by the destination node to the source node carries information about a highest transmission priority, where a packet loss priority corresponding to the highest transmission priority is the lowest.

In the foregoing embodiment, the backhaul probe data packet (that is, the probe data packet backhauled by the destination node to the source node) carries the information about the highest transmission priority, so that a transmission node may be effectively prevented from discarding the backhaul probe data packet, and it is ensured that the source node may send the service data packet based on information about a sequence in which forward probe data packets arrive at the destination node.

In an embodiment, the probe data packet does not include a data domain (e.g., payload).

In the foregoing embodiment, the probe data packet does not include the data domain, so that traffic overheads caused by sending the probe data packet may be effectively reduced.

According to a third aspect, this disclosure provides a communication method. In an embodiment, a transmission node receives a data packet, where the data packet carries a number, and the number is used to select a transmission path for the data packet. The transmission node calculates a hash value based on a source Internet protocol (IP) address, a destination IP address, a source port, a destination port, a transport-layer protocol, and the number that are corresponding to the data packet. The transmission node selects an egress port corresponding to the hash value to forward the data packet based on the hash value.

In the foregoing embodiment, a new input variable (e.g., a number) is introduced, so that different service data packets or probe data packets in a same data flow may be hashed to different transmission paths. This implements multipath packet-by-packet load sharing.

In an embodiment, the data packet is a probe data packet or a service data packet.

In an embodiment, the transmission node allocates a first bandwidth to service data packet transmission, and allocates a second bandwidth to probe data packet transmission, where the first bandwidth is greater than the second bandwidth. In an embodiment, a ratio of the second bandwidth to the first bandwidth represents a ratio of an average size of the probe data packets to an average size of the service data packets.

In the foregoing embodiment, transmission bandwidths are allocated to the probe data packet and the service data packet based on the ratio of the average size of the probe data packets to the average size of the service data packets. This helps the transmission node properly allocate bandwidth resources used to transmit the probe data packet and the service data packet.

In an embodiment, when the probe data packet received by the transmission node is a forward probe data packet, the transmission node transmits the forward probe data packet by using the second bandwidth. When the probe data packet received by the transmission node is a backhaul probe data packet, the transmission node transmits the backhaul probe data packet by using the first bandwidth. The forward probe data packet is a probe data packet sent by a source node to a destination node, and the backhaul probe data packet is a probe data packet backhauled by the destination node to the source node.

In the foregoing embodiment, the transmission node may be effectively prevented from discarding the backhaul probe data packet, and it is ensured that the source node may send the service data packet based on information about a sequence in which forward probe data packets arrive at the destination node.

In an embodiment, the transmission node discards the forward probe data packet when a rate at which the transmission node receives the forward probe data packets is greater than the second bandwidth. For example, the transmission node discards a forward probe data packet that exceeds a transmission capability (e.g., the second bandwidth).

In the foregoing embodiment, the transmission node discards the forward probe data packet that exceeds the transmission capability, so that the source node may adjust a probe data packet sending rate based on a packet loss rate of the probe data packet. This can effectively ensure that the probe data packet sending rate matches a transmission bandwidth, and avoid extra traffic and processing resource overheads.

In an embodiment, the backhaul probe data packet carries information about a highest transmission priority, and a packet loss priority corresponding to the highest transmission priority is the lowest.

In the foregoing embodiment, the backhaul probe data packet carries the information about the highest transmission priority, so that the transmission node may be effectively prevented from discarding the backhaul probe data packet, and it is ensured that the source node may send the service data packet based on information about a sequence in which forward probe data packets arrive at the destination node.

In an embodiment, the probe data packet does not include a data domain (e.g., payload).

In the foregoing embodiment, the probe data packet does not include the data domain, so that traffic overheads caused by sending the probe data packet may be effectively reduced.

According to a fourth aspect, an embodiment of this disclosure provides a communication apparatus. The apparatus has a function of performing the method according to any one of the first aspect or the possible designs of the first aspect. The function may be implemented by hardware, or by hardware by executing corresponding software. The hardware or software includes one or more units (modules) corresponding to the foregoing function, for example, a communication unit and a processing unit.

In an embodiment, the apparatus may be a chip or an integrated circuit.

In an embodiment, the apparatus includes a processor and a communication interface. The processor is coupled to the communication interface, and is configured to perform the method according to any one of the first aspect or the possible embodiments of the first aspect. It may be understood that the communication interface may be a transceiver or an input/output interface. The apparatus may further include a memory, and the memory stores a program that may be executed by the processor to implement the method according to any one of the first aspect or the possible embodiments of the first aspect.

In an embodiment, the apparatus may be a source node.

According to a fifth aspect, an embodiment of this disclosure provides a communication apparatus. The apparatus has a function of performing the method according to any one of the second aspect or the possible embodiments of the second aspect. The function may be implemented by hardware, or by hardware by executing corresponding software. The hardware or software includes one or more units (modules) corresponding to the foregoing function, for example, a communication unit and a processing unit.

In an embodiment, the apparatus may be a chip or an integrated circuit.

In an embodiment, the apparatus includes a processor and a communication interface. The processor is coupled to the communication interface, and is configured to implement the method according to any one of the second aspect or the possible embodiments of the second aspect. It may be understood that the communication interface may be a transceiver or an input/output interface. The apparatus may further include a memory, and the memory stores a program that may be executed by the processor to perform the method according to any one of the second aspect or the possible embodiments of the second aspect.

In an embodiment, the apparatus may be a destination node.

According to a sixth aspect, an embodiment of this disclosure provides a communication apparatus. The apparatus has a function of performing the method according to any one of the third aspect or the possible embodiments of the third aspect. The function may be implemented by hardware, or by hardware by executing corresponding software. The hardware or software includes one or more units (modules) corresponding to the foregoing function, for example, a communication unit and a processing unit.

In an embodiment, the apparatus may be a chip or an integrated circuit.

In an embodiment, the apparatus includes a processor and a communication interface. The processor is coupled to the communication interface, and is configured to perform the method according to any one of the third aspect or the possible designs of the third aspect. It may be understood that the communication interface may be a transceiver or an input/output interface. The apparatus may further include a memory, and the memory stores a program that may be executed by the processor to perform the method according to any one of the third aspect or the possible embodiments of the third aspect.

In an embodiment, the apparatus may be a transmission node.

According to a seventh aspect, this disclosure provides a computer-readable storage medium, where the storage medium stores computer instructions, and when the computer instructions are executed, the method according to any one of the first aspect or the possible embodiments of the first aspect may be implemented, the method according to any one of the second aspect or the possible embodiments of the second aspect may be performed, or the method according to any one of the third aspect or the possible embodiments of the third aspect may be implemented.

According to an eighth aspect, this disclosure further provides a computer program product, including a computer program or instructions. When the computer program or the instructions is/are executed, the method according to any one of the first aspect or the possible embodiments of the first aspect may be performed, the method according to any one of the second aspect or the possible embodiments of the second aspect may be implemented, or the method according to any one of the third aspect or the possible embodiments of the third aspect may be implemented.

According to a ninth aspect, this disclosure further provides a chip, where the chip is configured to perform the method according to the first aspect or the possible embodiments of the first aspect, implement the method according to any one of the second aspect or the possible embodiments of the second aspect, or implement the method according to any one of the third aspect or the possible embodiments of the third aspect.

For technical effects that can be achieved in the fourth aspect to the ninth aspect, refer to the technical effects that can be achieved in the first aspect to the third aspect. Details are not described herein again.

BRIEF DESCRIPTION OF DRAWINGS

FIG. 4 is a schematic diagram of an ECMP principle of a flow-by-flow load sharing solution in which a congestion status is unaware according to an embodiment of this disclosure;

FIG. 5 is a schematic diagram of a principle of a fine-grained load balancing solution Presto in which a congestion status is unaware according to an embodiment of this disclosure;

FIG. 6 is a schematic diagram of a principle of a scheduling policy based on end-to-end congestion information according to an embodiment of this disclosure;

DESCRIPTION OF EMBODIMENTS

Figure 3:
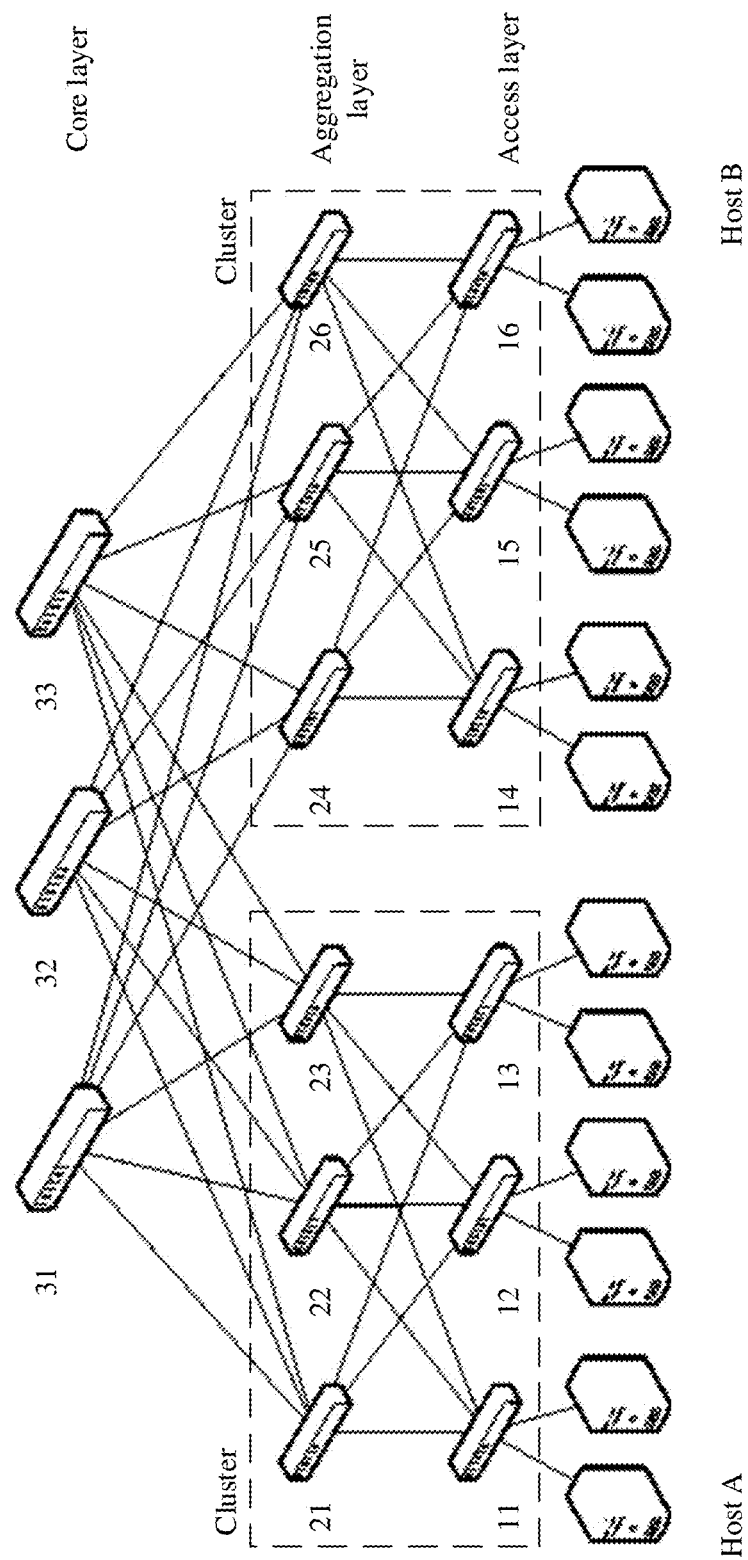
FIG. 3 is a schematic diagram of an architecture of a communication system according to an embodiment of this disclosure.

FIG. 3 is a schematic diagram of an architecture of a possible communication system according to an embodiment of this disclosure. The communication system includes a plurality of hosts and a plurality of transmission nodes. The transmission nodes on an access layer and an aggregation layer may be divided into different clusters, and in each cluster, each transmission node on the access layer is connected to each transmission node on the aggregation layer. In addition, each transmission node at the aggregation layer is connected to one or more transmission nodes at a core layer, so that each cluster may be connected to any transmission node at the core layer. In the communication system architecture shown in FIG. 3, there are a plurality of transmission paths between transmission nodes on any two access layer, to implement high-bandwidth and low-delay communication between the two transmission nodes.

In addition, during data transmission, any host in FIG. 3 may be used as a source node for data transmission, namely, a data transmitting end, or may be used as a destination node for data transmission, namely, a data receiving end, to transmit data by using a plurality of transmission paths established by a plurality of transmission nodes. For example, a host A is used as the source node for data transmission, and a host B is used as the destination node for data transmission. Transmission paths existing between the source node and the destination node include a transmission path 1: a transmission node 11 to a transmission node 21 to a transmission node 31 to a transmission node 24 to a transmission node 16; a transmission path 2: the transmission node 11 to the transmission node 22 to the transmission node 31 to the transmission node 24 to the transmission node 16; a transmission path 3: the transmission node 11 to the transmission node 23 to the transmission node 31 to the transmission node 24 to the transmission node 16; a transmission path 4: the transmission node 11 to the transmission node 23 to the transmission node 32 to the transmission node 24 to the transmission node 16; and a transmission path 5: the transmission node 11 to the transmission node 23 to the transmission node 32 to the transmission node 25 to the transmission node 16 and another transmission paths. This disclosure aims to resolve a problem of how to distribute an amount of data transmitted on each transmission path when there are a plurality of transmission paths between a source node and a destination node for data transmission, to fully utilize bandwidth resources of transmission paths, avoid disorder of transmitted data, and implement optimal load sharing.

Before embodiments of this disclosure are described, some terms in this disclosure are first described, to help a person skilled in the art have a better understanding.

(1) A host is a device having a receiving and sending function, for example, a handheld device, a vehicle-mounted device, a wearable device, a computing device, a service server, a mobile station (MS) or another processing device connected to a wireless modem that has a wireless/wired connection function, a mobile terminal that communicates with one or more core networks by using an access network, and the like. This is not limited in this embodiment of this disclosure.

(2) A transmission node is a device having a data exchange (e.g., forwarding) function, and may be a switch, a device such as a router or a gateway, or another apparatus or device having a data exchange function. This is not limited in this embodiment of this disclosure.

(3) A 5-tuple usually refers to a source IP address, a source port, a destination IP address, a destination port, and a transport layer protocol (TCP). For example, 192.168.1.1 10000 TCP 121.14.88.76 80 is a 5-tuple. This means that a node whose IP address is 192.168.1.1 is connected to a node whose IP address is 121.14.88.76 and whose port number is 80 through a port 10000 by using the TCP protocol. In this embodiment of this disclosure, the transmission node may perform hash calculation based on a 5-tuple of a received data packet, and select an egress port based on a hash value obtained through calculation. For example, if the hash value obtained after the 5-tuple hash calculation is 80, an egress port 80 of the transmission node is selected to forward a data packet; and if the hash value obtained after the 5-tuple hash calculation is 100, an egress port 100 of the transmission node is selected to forward the data packet.

(4) An equal cost multipath (ECMP) solution is a flow-by-flow load balancing solution in which a congestion status is unaware. As shown in FIG. 4, in an ECMP scheduling solution, egress ports for forwarding different data flows are calculated by using a hash method based on a 5-tuple, to complete one-to-one mapping between each data flow and an end-to-end transmission path, and evenly hash different data flows to the end-to-end transmission paths. Because a 5-tuple of each flow is determined, an egress port of each ECMP hash is also uniquely determined, and an end-to-end transmission path of the flow is also finally uniquely determined. However, a biggest problem of the ECMP load sharing solution is that when traffic sizes are not evenly distributed on a network (an elephant flow and a mouse flow are mixed), the elephant flow and the mouse flow are treated equally and are allocated to different transmission paths. This results in load imbalance between the transmission paths.

(5) A Presto solution is a fine-grained load balancing solution in which a congestion status is unaware. As shown in FIG. 5, the Presto solution does not adjust with a real-time change of a data center status in an entire scheduling process, and a scheduling policy is fixed. In this solution, a round robin method is used, and a plurality of data flows arriving at an end side are sequentially scheduled to different end-to-end transmission paths in turn at a granularity of a flow cell (a data flow with a fixed size of 64 KB). Because this type of technical solution does not need to probe and record real-time status information, execution efficiency of the solution is very high, and no additional storage and computing overheads is introduced. A main principle of the Presto solution is as follows. It is assumed that a plurality of end-to-end transmission paths in a network are equivalent. Therefore, a simple hash method is used to implement one-to-one mapping between each data flow and each end-to-end transmission path, so that the data flow is evenly distributed and scheduled to each end-to-end transmission path. However, in a data center network or a wide area network (WAN) network of an asymmetric architecture, quantities of links connected to transmission nodes in a plurality of end-to-end transmission paths are usually different. In addition, due to heterogeneous devices, physical transmission rates of the links may also be different. In addition, in a scheduling process, because a data flow may arrive suddenly, a load status of each transmission node on each end-to-end transmission path dynamically changes. As a result, performance of each end-to-end transmission path in an asymmetric network is likely to vary significantly. In this case, if the data flow is simply evenly scheduled to the end-to-end transmission paths, severe load imbalance of the transmission paths is caused. Some transmission paths are heavily congested, while load of another transmission path is relatively light. In addition, in an asymmetric network architecture, a data disorder problem may occur.

(6) A CONGA solution is a scheduling policy solution based on end-to-end congestion information. As shown in FIG. 6, before each data scheduling decision is made, congestion information of all end-to-end transmission paths that pass through an edge transmission node is detected (generally, a congestion status of a path may be approximately analyzed by using an indicator such as round trip time (RTT) or an explicit congestion notification (ECN)). In addition, congestion statuses of all transmission paths are recorded in a path status table. When the scheduling decision is made, a scheduling algorithm queries congestion statuses of all end-to-end transmission paths in the path status table, to complete deterministic scheduling of data. For example, a newly generated data flow is scheduled to an end-to-end transmission path with a lightest current load (a method of a CONGA policy). In this policy, a congestion status of a data center network is detected in real time, and a data scheduling solution is continuously adjusted in real time, to implement load balancing of a plurality of transmission paths. In terms of scheduling granularity, to avoid a data disorder problem caused by packet-by-packet scheduling, CONGA uses a scheduling solution based on a flowlet data packet burst (burst of packets) to ensure that a packet interval between flowlets is greater than a maximum delay difference of a path. In this way, it is ensured that data disorder is not caused between flowlets of a plurality of paths. However, a biggest disadvantage of the CONGA solution is that probing status information of all transmission paths in a large-scale network causes a large amount of information polling time consumption, therefore, this results in a severe delay of information in the path status table. Serious information polling and time-consuming control are not conducive to real-time scheduling of data flows. In addition, maintaining congestion information of all end-to-end transmission paths and executing a scheduling policy in a large-scale network cause great storage and computing overheads. Therefore, a policy such as CONGA can be used only in a small-scale layer-2 data center network, and cannot be applied to a large-scale network.

Figure 7:
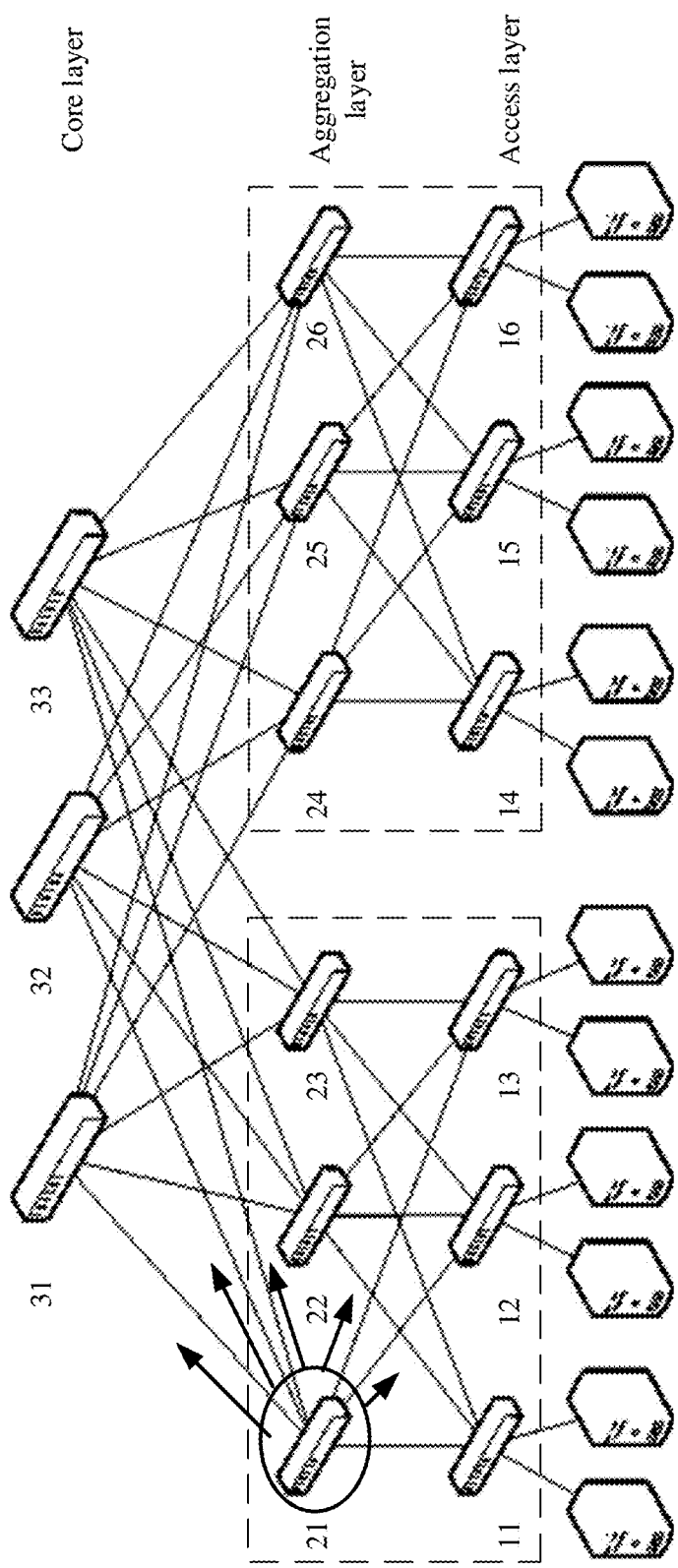
FIG. 7 is a schematic diagram of a principle of a scheduling policy based on local state information according to an embodiment of this disclosure.

(7) A DRILL solution is a scheduling policy based on local state information. As shown in FIG. 7, in a local scheduling policy, local scheduling of data is completed by using only local congestion information of a node. Therefore, when this technical solution is applied, each node on an end-to-end transmission path makes a scheduling decision again, instead of making a scheduling decision only on an edge transmission node or a source node. During each local scheduling, a scheduling policy generates a scheduling decision based on congestion information (for example, a data backlog amount of each port) of a local node. In this solution, only status information of local nodes needs to be recorded, and status information of a global end-to-end transmission path does not need to be recorded. Therefore, information storage and polling overheads are greatly optimized. Real-time scheduling requirements can be met. However, according to a local information-based scheduling policy, global scheduling decisions are distributed to local nodes, and end-to-end routing of network data is completed by sequentially executing local node policies on an end-to-end transmission path. The biggest problem of this solution is that a response to a link and device faults is slow. In this policy, if a fault occurs on a node (for example, a transmission node), only a neighboring node of the node may detect the fault in time. A remote node cannot detect a congestion and fault status because it does not detect status information of the end-to-end transmission path. Therefore, when a fault or congestion occurs on the remote node of the end-to-end transmission path, because a local node cannot sense a change of a path status in time, the local node still uses a previous scheduling solution, and does not adjust a scheduling policy until congestion is transferred to a neighboring node of the local node. Therefore, the scheduling policy is easy to form a local congestion tree. In addition, the local optimal solution also sacrifices precision of load balancing.

In addition, it should be understood that in this embodiment of this disclosure, at least one may be alternatively described as one or more, and more may represent two, three, four, or more. This is not limited in this disclosure.

In embodiments of this disclosure, "/" may represent an "or" relationship between associated objects. For example, A/B may represent A or B. "and/or" may be used to indicate that there are three relationships between associated objects. For example, A and/or B may represent: Only A exists, both A and B exist, and only B exists. A and B may be singular or plural. To facilitate description of the technical solutions in embodiments of this disclosure, terms such as "first" and "second" may be used to distinguish between technical features with a same or similar function. Terms such as "first" and "second" do not limit a quantity and an execution sequence, and the terms such as "first" and "second" do not indicate a definite difference. In embodiments of this disclosure, the word such as "example" or "for example" is used to represent an example, an illustration, or a description, and is described as "example" or "for example". Any embodiment or design scheme should not be explained as being more preferred or having more advantages than another embodiment or design scheme. Use of the word such as "example" or "for example" is intended to present a related concept in a specific manner for ease of understanding.

Because a data packet may provide a possibility of data flow adjustment in a minimum unit, in this embodiment of this disclosure, a packet-by-packet scheduling solution based on a finest granularity is a theoretically optimal load sharing policy, and aims to further resolve a data disorder problem based on packet-by-packet scheduling, to implement optimal load balancing. The following describes embodiments of this disclosure in detail with reference to the accompanying drawings.

Embodiment 1

Figure 8:
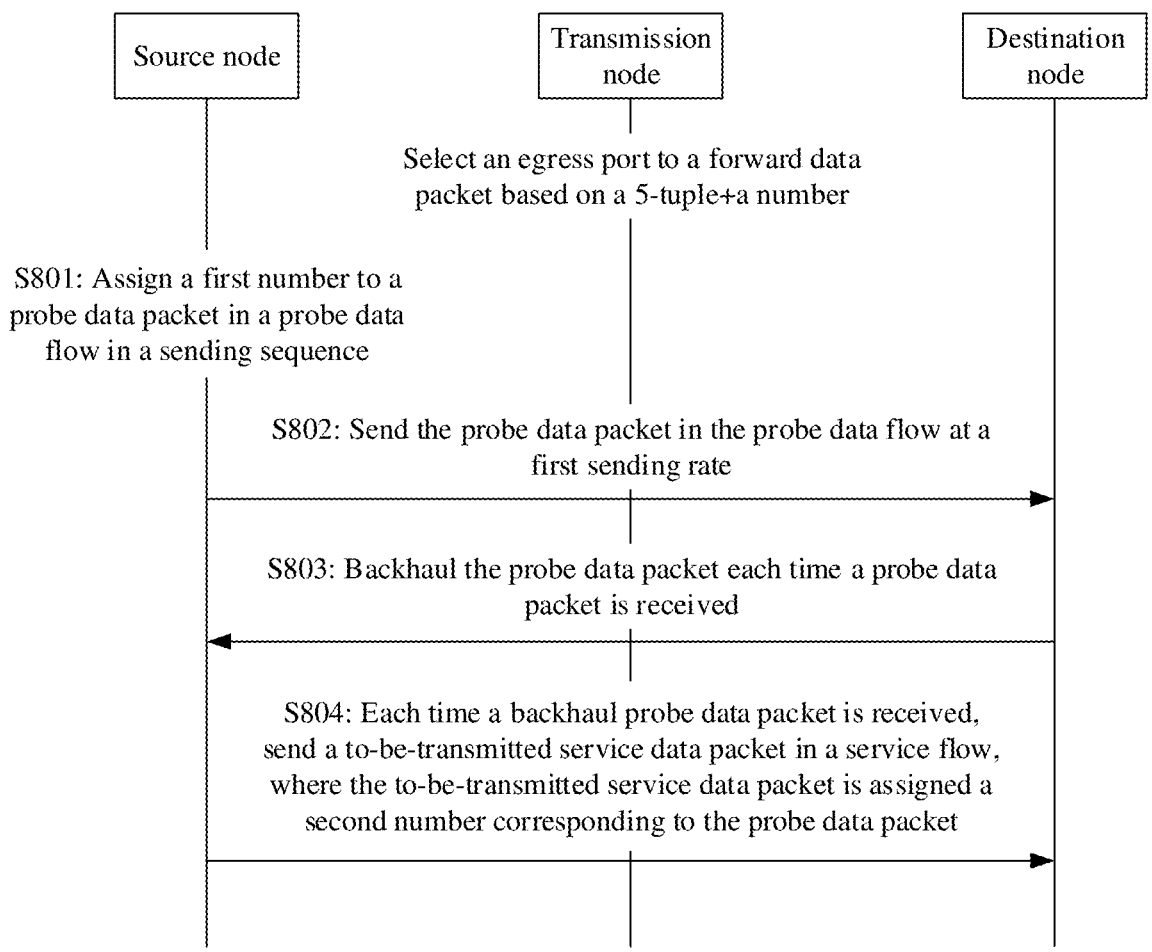
FIG. 8 is a schematic diagram 1 of a communication process according to an embodiment of this disclosure.

FIG. 8 is a schematic diagram of a communication process according to an embodiment of this disclosure. The process includes the following operations.

In operation S801, a source node assigns a first number to a probe data packet in a probe data flow in a sending sequence, where the first number is used to select a transmission path for the probe data packet.

In an embodiment of this disclosure, a congestion control mechanism of probe data packet (credit) micro-rehearsal is used to send a service data packet. To be specific, before the service data packet is sent, transmission of the service data packet is simulated by using probe data, and the service data packet is sent based on a simulation result of the probe data packet.

To hash data packets in a same data flow to different transmission paths, and implement load sharing between a plurality of transmission paths, in an embodiment of this disclosure, a hash algorithm is redesigned based on an existing hash algorithm for a transmission path. Based on the 5-tuple (i.e., source IP address, source port, destination IP address, destination port, and transport layer protocol), a new variable "seq" is introduced to form a 6-tuple. In this way, different data packets in a same data flow have a same 5-tuple but different numbers, hash values calculated through hash calculation based on the 5-tuple+number are different, so that different data packets in a same data flow may be hashed to different transmission paths.

In an embodiment, the number may be carried in any idle field in a packet header. For example, the number may be carried by using an options field, a time to live (TTL) field, or the like in the packet header.

In an embodiment, when a service data flow needs to be transmitted by the source node, the source node first sends a probe data packet to probe congestion statuses of a plurality of transmission paths. To ensure that a plurality of probe data packets in a same probe data flow are routed and forwarded through the plurality of transmission paths, the source node may assign a first number to the probe data packets in the same probe data flow in ascending order based on a sending sequence of the probe data packets. For example, a value "1" is assigned to a first number of a first probe data packet in the probe data flow, a value "2" is assigned to a first number of a second probe data packet, a value "3" is assigned to a first number of a third probe data packet, and the rest may be deduced by analogy.

In addition, to reduce traffic overheads caused by the probe data packet, the probe data packet may not include a data domain (e.g., payload), that is, the probe data packet may include only a header, to reduce an amount of data.

In operation S802, the source node sends the probe data packet in the probe data flow to a destination node at a first sending rate.

In a possible embodiment, the source node may use determined duration as a transmission period, and send the probe data packet to the destination node at an equal interval (pacing) in each transmission period. The first sending rate at which the source node sends the probe data packet to the destination node may be 0.5 Gbps or the like.

After receiving the probe data packet (a forward probe data packet) that carries the first number and that is sent by the source node, the transmission node located between the source node and the destination node performs hash calculation based on a total of six input parameters: the 5-tuple+the first number in the probe data packet, to obtain a hash value, and selects an egress port based on the obtained hash value.

For example, a 5-tuple of a first probe data packet+the first number are 192.168.1.1 10000 TCP 121.14.88.76 80+1, the hash value obtained by the transmission node through calculation is 80, and the first probe data packet is forwarded through the egress port 80. A 5-tuple of a second probe data packet+a first number are 192.168.1.1 10000 TCP 121.14.88.76 80+2, the hash value obtained by the transmission node through calculation is 85, and the second probe data packet is forwarded through an egress port 85.

In operation S803, the destination node backhauls a probe data packet to the source node each time the destination node receives the probe data packet from the source node.

In an embodiment, each time after receiving a data packet, the destination node may first determine whether the data packet is a probe data packet or a service data packet, and if the received data packet is the probe data packet, the destination node backhauls the probe data packet. For example, the destination node may exchange a source IP address and a destination IP address of the probe data packet and send the probe data packet, and backhaul the probe data packet to the source node. If the data packet received by the destination node is a service data packet, the destination node parses the service data packet. For example, the destination node decapsulates the service data packet, and reads data carried in the service data packet.

Similarly, after receiving the probe data packet (e.g., a backhaul probe data packet) that carries the first number and that is backhauled by the destination node, the transmission node located between the source node and the destination node performs hash calculation based on a total of six input parameters: the 5-tuple+the first number in the probe data packet, to obtain a hash value, and selects an egress port based on the obtained hash value.

In operation S804, each time the source node receives a probe data packet backhauled by the destination node, the source node sends a service data packet in a service data flow, where the service data packet is assigned a second number corresponding to the probe data packet, and the second number is used to select a transmission path for the service data packet.

Each time the source node receives a probe data packet (e.g., the backhaul probe data packet) backhauled by the destination node, the source node reads a first number carried in the probe data packet, and assigns the first number carried in the received probe data packet to a current service data packet in the service data flow as a second number of the service data packet, and sends the service data packet to the destination node.

For example, the source node receives a probe data packet backhauled by the destination node, and a first number carried in the probe data packet is assigned with "5". In this case, the source node may assign "5" to a second number of a current service data packet in the service data flow, and send the service data packet to the destination node.

After receiving the service data packet (e.g., a forward service data packet) that carries the second number and sent by the source node, the transmission node located between the source node and the destination node performs hash calculation based on a total of six input parameters: the 5-tuple+the second number in the service data packet, to obtain a hash value, and selects an egress port based on the obtained hash value.

Probe data packets backhauled by the destination node continuously arrive at the source node. This triggers the source node to send service data packets in the service data flow to the destination node. The source node continuously sends the service data packets to the destination node until the service data packets are completely sent.

To accurately simulate service data packet transmission, in an embodiment, the transmission node that is located between the source node and the destination node and that is configured to forward a service data packet and a probe data packet may allocate different transmission bandwidths to service data packet transmission and probe data packet transmission. For example, the transmission node may allocate a first bandwidth to the service data packet and allocate a second bandwidth to the probe data packet based on a ratio of the average size of the service data packets to the average size of the probe data packets. For example, the ratio of the average size of the probe data packets to the average size of the service data packets is 1:19. The transmission node may use 5% of total bandwidth of the transmission node for the probe data packet transmission, and use 95% of total bandwidth of the transmission node for the service data packet transmission. In addition, the transmission node may further discard a service data packet and/or a probe data packet that exceeds a transmission capability, and the source node may also adjust, based on a packet loss rate of the probe data packet, the first sending rate for sending the probe data packet. For example, when the packet loss rate of the probe data packet is greater than a specified threshold (for example, 20%), the source node may down-regulate the first sending rate for sending the probe data packets (for example, down-regulate the first sending rate by 10%).

In addition, to cope with burst transmission of the probe data packets, a small quantity of buffers may be further reserved in the transmission node to cope with the burst transmission of the probe data packets. For example, the transmission node may reserve 8 or 10 buffers of an average size of probe data to cope with the burst transmission of the probe data packets.

Figure 9:
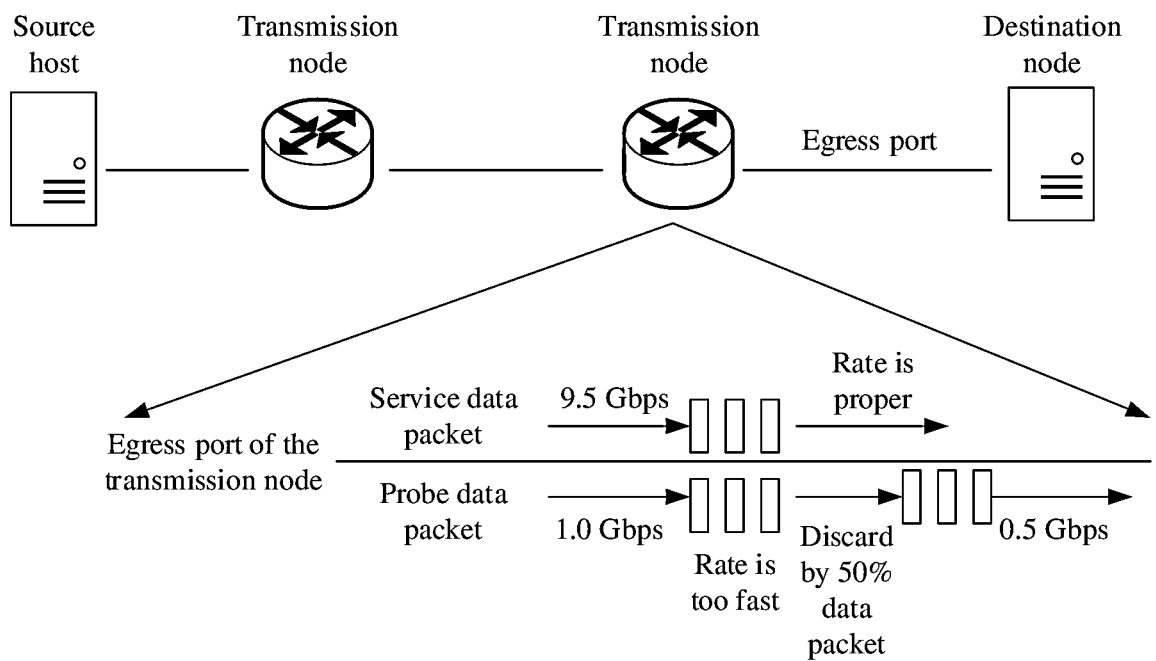
FIG. 9 is a schematic diagram of a congestion control mechanism of an intermediate transmission node according to an embodiment of this disclosure.

As shown in FIG. 9, a total bandwidth of a transmission node is 10 Gbps. The transmission node may configure a bandwidth of 9.5 Gbps to transmit a service data packet, and configure a bandwidth of 0.5 Gbps to transmit a probe data packet. A transmission rate at which the source node sends a probe data packet is 1 Gbps, and exceeds a second bandwidth (0.5 Gbps) used by the transmission node to transmit the probe data packet. The transmission node discards the probe data packet that exceeds a transmission capability, and a packet loss rate of the transmission node for the probe data packet is 50%. The probe data packets backhauled by the destination node are only 50% of the probe data packets sent by the source node. Therefore, after 50% of the probe data packets are discarded, an arrival rate of the backhaul probe data packets (the probe data packets backhauled by the destination node) is 1 Gbps*50%=0.5 Gbps. Each time the source node receives a backhaul probe data packet, the source node sends a true service data packet. With reference to a ratio of the size of the service data packet to the size of the probe data packet, a sending rate of the service data packet is 0.5 Gbps*19=9.5 Gbps. This exactly matches the first bandwidth. Therefore, it is ensured that transmission of the service data packet does not cause congestion (buffer overstock occurs on the transmission node) or an under-throughput (the first bandwidth is not fully occupied).

In addition, to avoid discarding of the backhaul probe data packet (the probe data packet backhauled by the destination node), the backhaul probe data packet carries information about a highest transmission priority, and the backhaul probe data packet may be transmitted on the transmission node by using the first bandwidth used to transmit the service data packets. A packet loss priority corresponding to the highest transmission priority is the lowest.

In the foregoing method, it is equivalent to that a service data packet transmission procedure is rehearsed in a current network environment by using a probe data packet as a "substitute" of a service data packet. The probe data packet is discarded by the transmission node, the probe data packet is backhauled by the destination node, and an accurate load status of the plurality of transmission paths in the network is transferred to the source node. The source node plans a transmission path of the service data packet based on an arrival sequence of the probe data packets. A service data packet that is first sent is sent by using a transmission path of a probe data packet that first arrived (by assigning values to a 5-tuple and a number, it is ensured that hash results of the service data packet and the probe data packet are consistent, that is, transmission paths are consistent).

Figure 10:
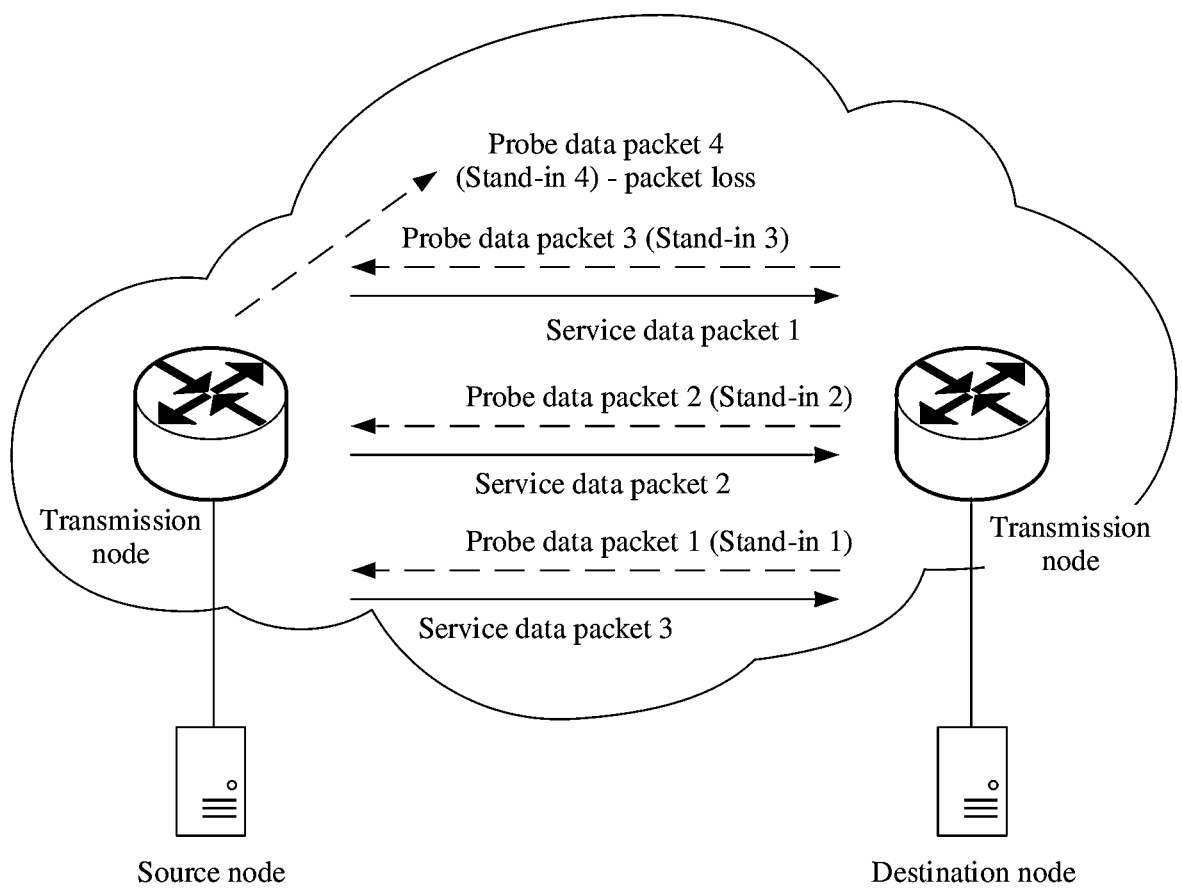
FIG. 10 is a schematic diagram of a working procedure of a load sharing policy according to an embodiment of this disclosure.

In addition, in an embodiment of this disclosure, a feature of strong symmetry of the data center network is mainly used. It is assumed that backhaul probe packets transmitted at a highest priority are not out of order in the symmetric data center network. Therefore, there is no need to add additional sequence information to the probe data packets, and a load status of a forward transmission path of the probe data packet is directly determined by using an arrival sequence of the backhaul probe data packets. As shown in FIG. 10, the source node sends four probe data packets on a probe data packet channel: Stand-in 1, Stand-in 2, Stand-in 3 and Stand-in 4. A packet of Stand-in 4 is lost in a transmission process. After receiving Stand-in 1 to Stand-in 3, the destination node transmits Stand-in 1 to Stand-in 3 back to the source node. The source node first receives Stand-in 3. This indicates that transmission path load of the probe data packet Stand-in 3 is the lightest. Therefore, when a first service data packet is transmitted, a number assignment value is the same as that of Stand-in 3. Then, the probe data packet Stand-in 2 arrives, and the source node transmits a service data packet 2, where a number assignment value is the same as that of Stand-in 2. Finally, the probe data packet Stand-in 1 arrives, and the source node transmits a service data packet 3, where a number assignment value is the same as that of Stand-in 1. Table 1 shows the comparison of number assignment values of related fields in the service data packet and the probe data packet. In Table 1, src_ip indicates the source IP address, src_port indicates the source port, dst_ip indicates the destination IP address, dst_port indicates the destination port, protocol indicates the transport layer protocol, and Seq indicates the number.

TABLE 1

| Sending sequence | Stand-in packet Six-tuple (Five-tuple + Seq value) (src_ip, src_port, dst_ip, dst_port, protocol, Seq) | Service data packet Six-tuple (Five-tuple + Seq value) (src_ip, dst_ip, src_port, dst_port, protocol, Seq) |
|---|---|---|
| 1 | (10.111.166.213, 10000, 10.111.166.206, 80, TCP, 1) | (10.111.166.213, 10000, 10.111.166.206, 80, TCP, 3) |
| 2 | (10.111.166.213, 10000, 10.111.166.206, 80, TCP, 2) | (10.111.166.213, 10000, 10.111.166.206, 80, TCP, 2) |

TABLE 1-continued

| Sending sequence | Stand-in packet Six-tuple (Five-tuple + Seq value) (src_ip, src_port, dst_ip, dst_port, protocol, Seq) | Service data packet Six-tuple (Five-tuple + Seq value) (src_ip, dst_ip, src_port, dst_port, protocol, Seq) |
|---|---|---|
| 3 | (10.111.166.213, 10000, 10.111.166.206, 80, TCP, 3) | (10.111.166.213, 10000, 10.111.166.206, 80, TCP, 1) |
| 4 | (10.111.166.213, 10000, 10.111.166.206, 80, TCP, 4) | — |

Finally, in an embodiment of this disclosure, it is ensured that the service data packet that is first sent by the source node is transmitted by using a transmission path with the lightest current load, to ensure that the service data packet arrives at the destination node in sequence. This resolves a disorder problem of packet-by-packet load sharing at a network layer, and does not require an additional order-preserving restoration operation at a transport layer.

Figure 11:
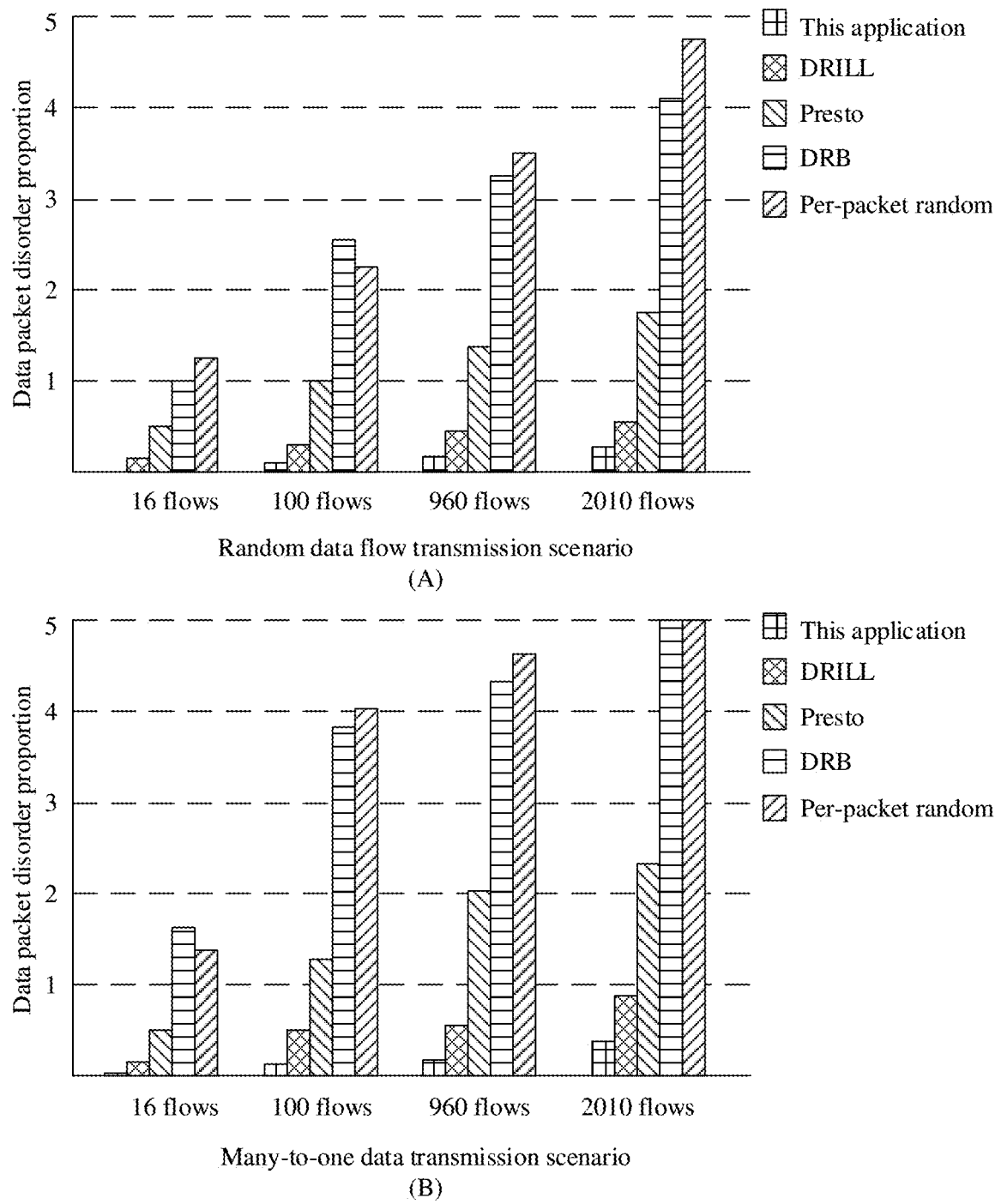
FIG. 11 is a schematic diagram of percentages of out-of-order data in different packet-by-packet load sharing policies according to an embodiment of this disclosure.

As shown in FIG. 11, in a scenario of random service data flow transmission and a scenario of many-to-one data transmission (Incast), a disorder level of service data transmission in different packet-by-packet load sharing policies is separately tested. In different scenarios, the quantity of concurrently transmitted service data flows is gradually increased (from 16 flows gradually increased to 2010 flows), and an overall disorder situation of the data center under different loads is compared. Other load sharing policies, such as DRILL, DRB, and Presto, proposed by the academic field are all implemented based on an OMNET simulation platform in a simulation experiment, and are used for comparison with the solutions in this disclosure. It may be learned that, compared with another latest load sharing method in the field, in the packet-by-packet load sharing in this disclosure, a proportion of out-of-order data packets is optimized to be within 0.4%. Even in a heavy-load scenario in which 2010 service data flows are concurrently transmitted, a problem of service data packet disorder is solved in the solutions of this disclosure. In addition, it should be noted that in the heavy-load scenario (concurrent transmission of 2010 data flows) in the Incast scenario, about 0.4% of data packets are out-of-order by using the solutions in this disclosure. A reason may be that high-concurrency probe data packet transmission causes packet loss and backhaul probe data packet disorder. This problem may be resolved by introducing a method for probing an arrival sequence of data packets in the following Embodiment 2. Generally, data disorder barely occurs when the load sharing method in this disclosure is applied.

Figure 12:
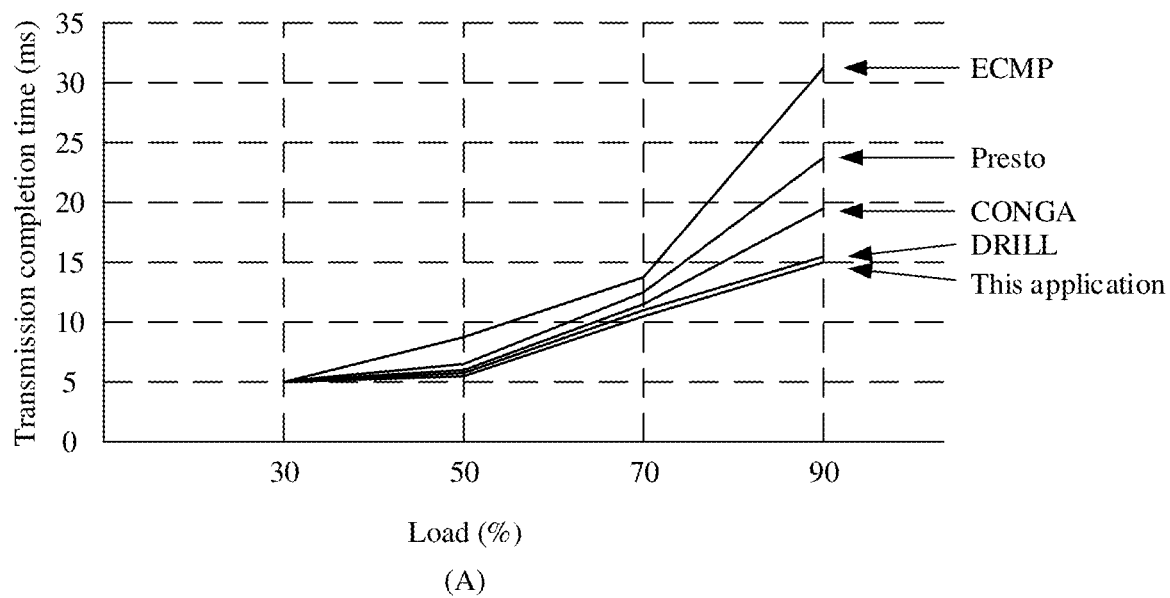
FIG. 12 is a schematic diagram of transmission completion time in different load sharing solutions according to an embodiment of this disclosure.
Figure 12:
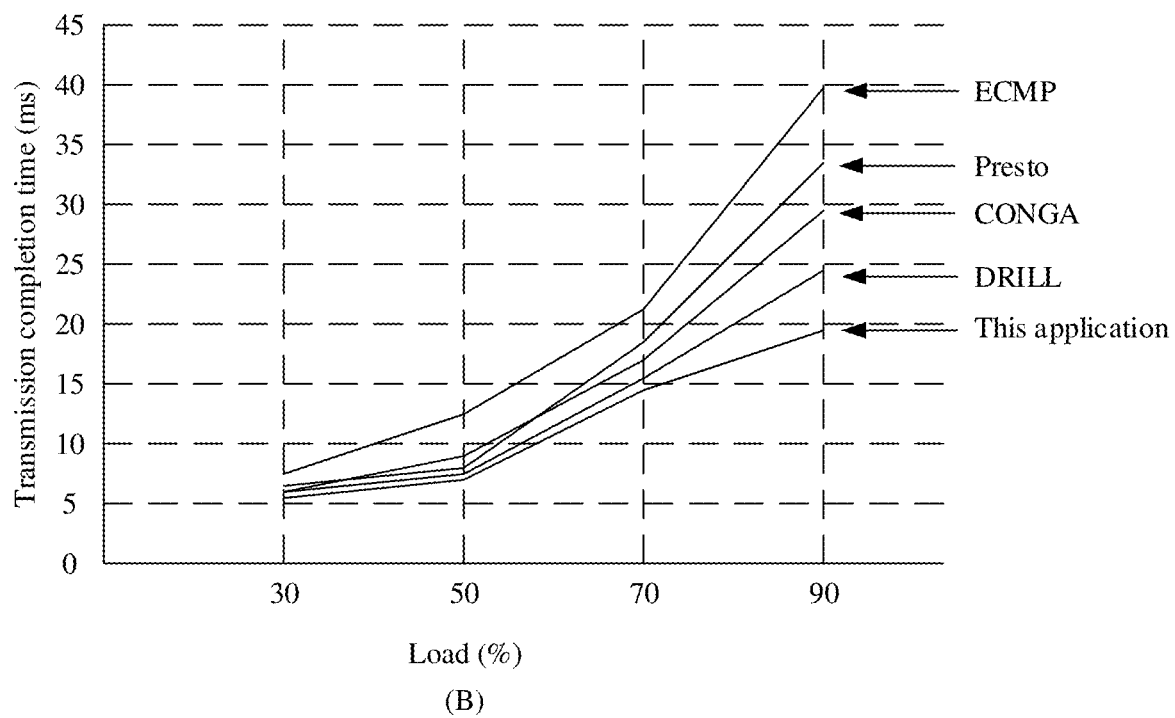

As shown in FIG. 12, overall completion time of data flows in different load sharing policies in the two scenarios shown in FIG. 11 is further compared. Background traffic is continuously increased on the network and comparison is performed on service data transmission completion time corresponding to different load balancing policies in different load conditions (from 30% to 90%). In this simulation experiment, classic load sharing solutions ECMP, CONGA, Presto, and DRILL are implemented based on the OMNET simulation platform, and are used as comparison solutions in this disclosure. A in FIG. 12 and B in FIG. 12 respectively show changes of service data transmission completion time corresponding to different load sharing solutions in the random data flow transmission scenario and the Incast scenario. It may be learned that because packet-by-packet load sharing implemented in this disclosure further balances load of a plurality of transmission paths, overall service data transmission completion time is better than that in another solution.

Embodiment 2

Figure 13:
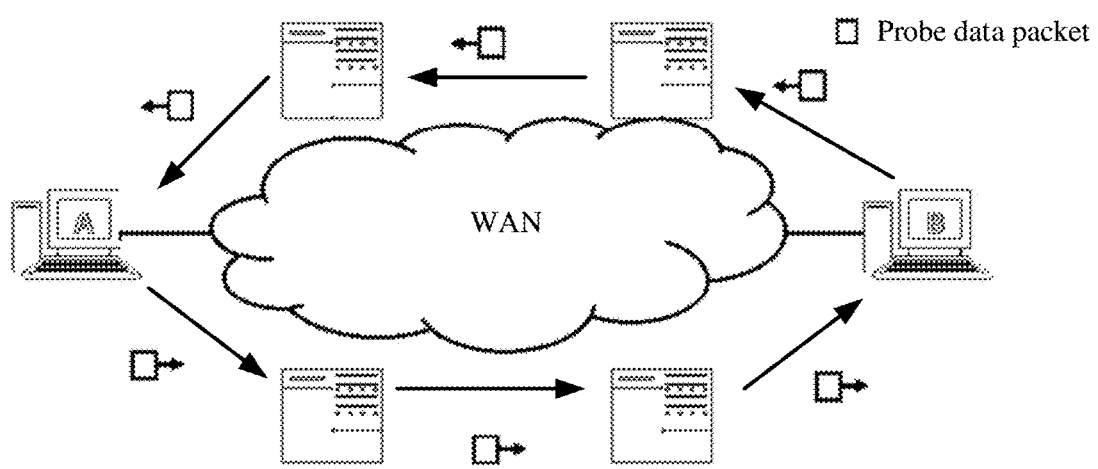
FIG. 13 is a schematic diagram of a wide area network scenario in which forward and backhaul paths are asymmetric according to an embodiment of this disclosure.

The solution in Embodiment 1 is mainly intended for a topologically symmetric data center network, and is designed based on a fact that disorder does not occur in backhaul probe data packets. It is considered that in a general WAN scenario, a forward transmission path and a backhaul transmission path for data transmission between the source node and the destination node may be highly asymmetric. As shown in FIG. 13, a transmission path of a forward probe data packet is different from a transmission path of a backhaul probe data packet, and a load status of a transmission path of the forward probe data packet may differ greatly from a load status of a transmission path of the backhaul probe data packet. Consequently, a disorder problem also occurs in transmission of the backhaul probe data packets transmitted on a plurality of paths, in this case, it is difficult to correctly deduce, based on only an order in which the backhaul probe data packets arrive at the source node, an order in which the forward probe data packets arrive at the destination node.

Figure 14:
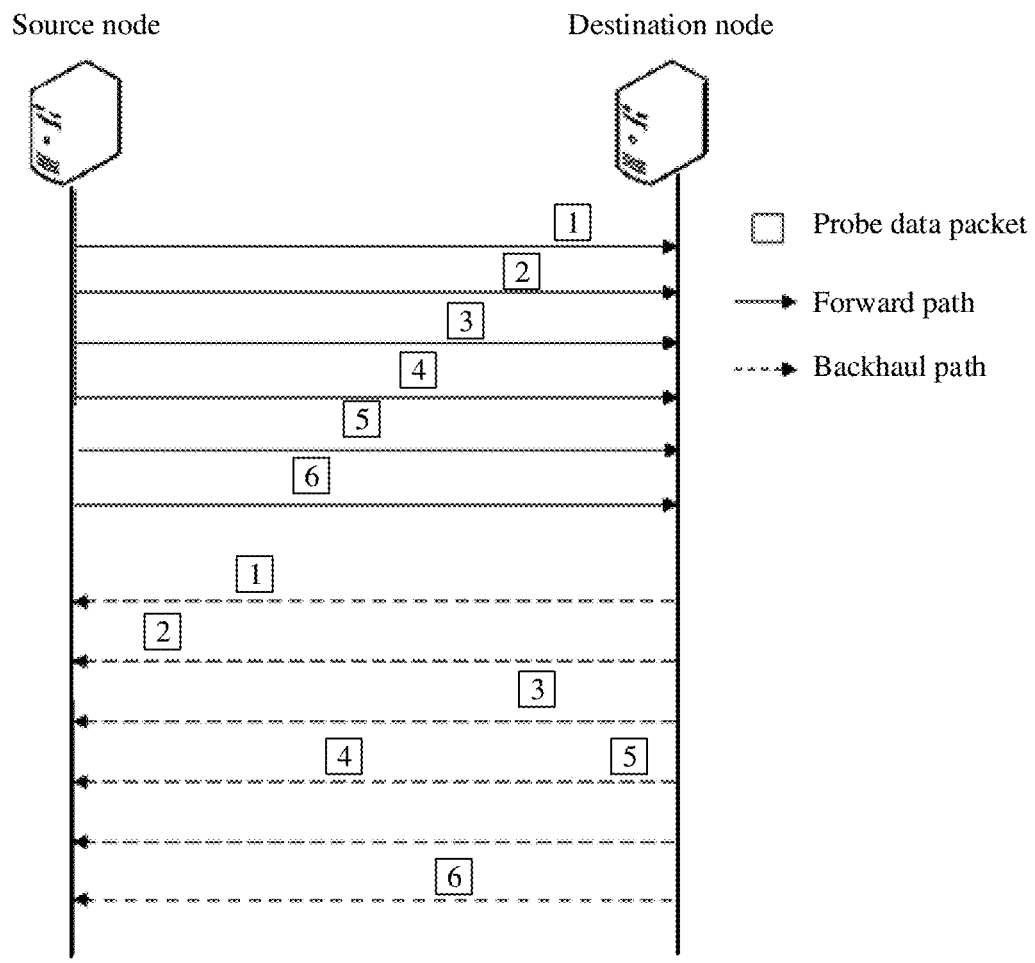
FIG. 14 is a schematic diagram of a scenario of transmission disorder of backhaul probe data packets in a wide area network according to an embodiment of this disclosure.

FIG. 14 describes a scenario in which disorder occurs in the backhaul probe data packets in the WAN scenario. As shown in FIG. 14, the source node sequentially transmits six probe data packets, and the six probe data packets are hashed to different transmission paths. Data disorder does not occur in a forward transmission process, and the destination node sequentially receives a probe data packet 1, a probe data packet 2, . . . , and a probe data packet 6. Each time the destination node receives a probe data packet, the destination node immediately backhauls the probe data packet to the source node. However, the data disorder problem occurs in transmission of the backhaul probe data packets. Due to different performance and load of backhaul paths, the probe data packet 2 first arrives at the source node, then the probe data packet 1 arrives, the probe data packet 4 arrives, . . . , and finally the probe data packet 5 arrives. In this scenario, if the technical solution in Embodiment 1 is still used, a second number of a service data packet 1 is assigned a value based on a first number of the probe data packet 2, and the service data packet 1 is transmitted based on a forward path of the probe data packet 2. A second number of the second transmitted service data packet 2 is assigned a value based on a first number of the probe data packet 1, and the service data packet 2 is transmitted based on a forward path of the probe data packet 1. However, it is known that during transmission on the forward path, a speed of the transmission path of the probe data packet 1 is higher than that of the transmission path of the probe data packet 2. Therefore, the service data packet 2 arrives at the destination node earlier than the service data packet 1. This causes transmission disorder of the service data packets. Therefore, in the WAN network scenario, the technical solution in Embodiment 1 needs to be improved, to further resolve a problem of transmission disorder of the backhaul probe data packets.

Figure 15:
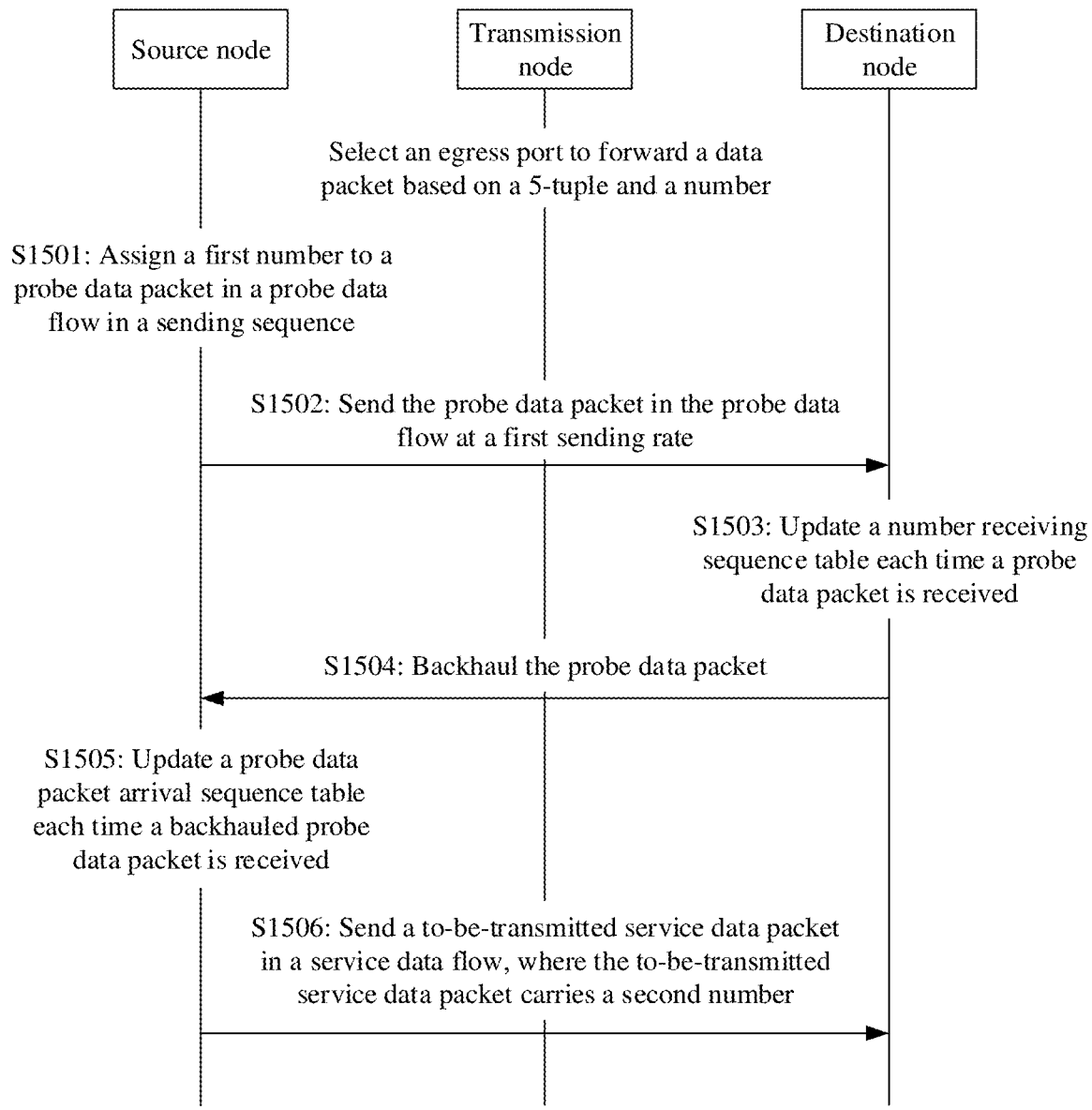
FIG. 15 is a schematic diagram 2 of a communication process according to an embodiment of this disclosure.

FIG. 15 is a schematic diagram of a communication process according to an embodiment of this disclosure. The process includes the following operations.

In operation S1501, a source node assigns a first number to a probe data packet in a probe data flow in a sending sequence, where the first number is used to select a transmission path for the probe data packet.

For a value assignment of the first number in the probe data packet, refer to related description in Embodiment 1. Details are not described again.

In operation S1502, the source node sends the probe data packet in the probe data flow to a destination node at a first sending rate.

In a possible embodiment, the source node may use determined duration as a transmission period, and send the probe data packet to the destination node at an equal interval (pacing) in each transmission period. The first sending rate at which the source node sends the probe data packet to the destination node may be 0.5 Gbps or the like.

For implementations of forwarding, by the transmission node, the probe data packet based on the first number of the probe data packet, and the like, refer to related description in Embodiment 1. Details are not described again.

In operation S1503, the destination node updates a number receiving sequence table each time the destination node receives a probe data packet from the source node, where the number receiving sequence table is used to record, based on a receiving sequence, a first number of a probe data packet that has been received by the destination node in a current period.

Figure 16:
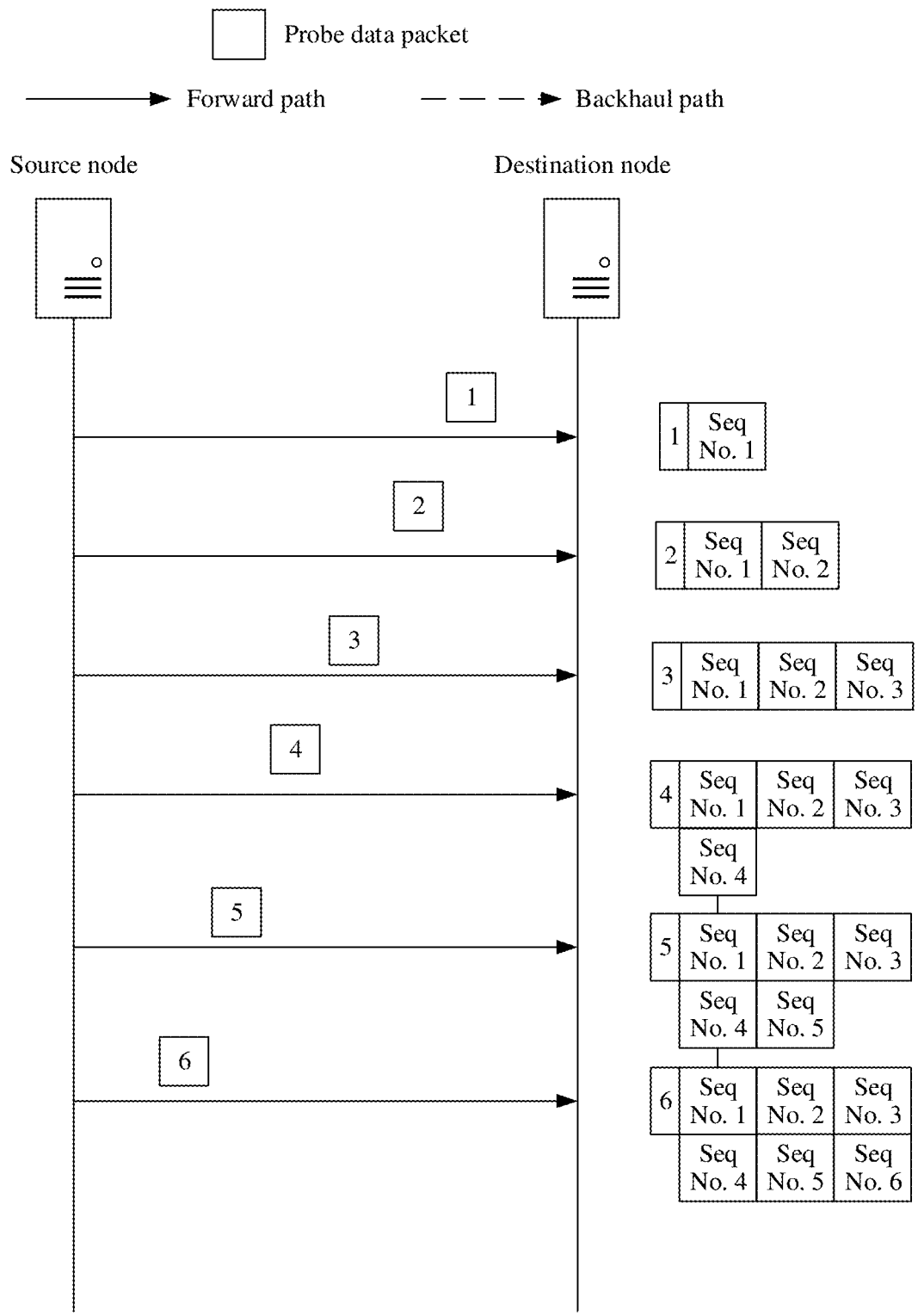
FIG. 16 is a schematic diagram in which forward probe data packets sequentially arrive according to an embodiment of this disclosure.

For example, as shown in FIG. 16, it is assumed that probe data packets arrive in a sequence from a probe data packet #1 to a probe data packet #6, and an action of the destination node is as follows. When the probe data packet #1 arrives, the destination node records a first number Seq1 in the number receiving sequence table. When a probe data packet #2 arrives, the destination node records a first number Seq2 in the number receiving sequence table. The rest may be deduced by analogy. When the probe data packet #6 arrives finally, the destination node records a first number Seq6 in the number receiving sequence table.

In operation S1504, the destination node backhauls the probe data packet to the source node, where the backhauled probe data packet carries the number receiving sequence table.

For example, each time the destination node receives a forward probe data packet, after completing an operation of updating a first number carried in the forward probe data packet to the number receiving sequence table, the destination node immediately backhauls the probe data packet, and records an updated number receiving sequence table in a packet header of the probe data packet.

As shown in FIG. 16, when backhauling the probe data packet #1, the destination node adds Seq1 to the probe data packet #1. When backhauling the probe data packet #2, the destination node adds Seq1 and Seq2 to the probe data packet #2. When a probe data packet #3 is backhauled, the destination node adds Seq1, Seq2, and Seq3 to the probe data packet #3. The rest may be deduced by analogy. When the probe data packet #6 is finally backhauled, first numbers Seq1 to Seq5 of the probe data packet #1 to a probe data packet #5 that arrive previously and the first number Seq6 of the probe data packet #6 that arrives previously are all recorded in backhaul probe data packets.

In operation S1505, each time the source node receives the probe data packet backhauled by the destination node, the source node updates a probe data packet arrival sequence table based on the number receiving sequence table carried in the probe data packet.

The probe data packet arrival sequence table records, based on a sequence in which a probe data packet arrives at the destination node, a first number of the probe data packet that has arrived at the destination node in the current period.

Figure 17:
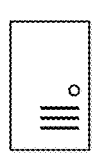
FIG. 17 is a schematic diagram of backhaul probe data packet disorder according to an embodiment of this disclosure.
Figure 17:
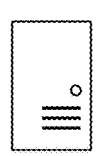

For example, it is assumed that a disorder case shown in FIG. 17 occurs in the backhaul probe data packets, the source node first receives the probe data packet #2, and the probe data packet #2 sequentially carries two first numbers: Seq1 and Seq2. The source node sequentially records the two first numbers in the probe data packet arrival sequence table. After receiving the probe data packet #1, the source node records the first number Seq1 in the probe data packet arrival sequence table (if a record of the first number exists in the probe data packet arrival sequence table, this operation is skipped). Then, the source node receives a probe data packet #4, and sequentially records four first numbers Seq1 to Seq4 in the probe data packet arrival sequence table. The rest may be deduced by analogy. The probe data packet #5 finally arrives. In this case, the probe data packet arrival sequence table of the source node sequentially records six first numbers in total, namely, Seq1 to Seq6.

In operation S1506, the source node sends a service data packet in the service data flow, where the service data packet carries a second number.

The second number is a first number that is determined by the source node in the probe data packet arrival sequence table based on an order of receiving probe data packets backhauled by the destination node in a current period and that is consistent with the order.

Each time the source node receives the probe data packet backhauled by the destination node, the source node sends a true service data packet. A 5-tuple (i.e., a source IP address, a destination IP address, a source port, a destination port, and a transport-layer protocol) of the service data packet is the same as that of the probe data packet, the source node plans a transmission path of the service data packet by assigning a specific value to a second number of the service data packet, so that service data packets arrive at the destination node in sequence. In an embodiment, in the scenario shown in FIG. 17, when receiving a backhaul probe data packet #2, the source node sends a service data packet #1. In this case, the source node obtains two first numbers Seq1 and Seq2 by parsing the probe data packet, therefore, it may be learned that although the probe data packet #2 arrives first in backhaul transmission, a first number of a probe data packet that first arrives at the destination node in forward transmission is actually Seq1. Therefore, when the service data packet #1 is sent, a second number of a service data packet is assigned Seq1. Then, a backhaul probe data packet #1 arrives, the source node sends a service data packet #2. In this case, it may be learned that, by searching the probe data packet arrival sequence table, a first number of a second arrived probe data packet in the forward transmission is Seq2, and a second number of the service data packet #2 is assigned Seq2. Then, the source node receives a backhaul probe data packet #4, and sends a service data packet #3. In this case, the probe data packet arrival sequence table sequentially records four first numbers Seq1 to Seq4 (recorded in the backhaul probe data packet #4), and the source node learns that a first number of a probe data packet that third arrives in the forward transmission is Seq3, therefore, a second number of the service data packet #3 is assigned Seq3. The rest may be deduced by analogy. Finally, the source node receives a backhaul probe data packet #5 and sends a service data packet #6. In this case, the probe data packet arrival sequence table of the source node sequentially records six first numbers in total: Seq1 to Seq6, and the source node assigns a first number Seq6 of a probe data packet that finally arrives in the forward transmission to a service data packet #6. Finally, second numbers of the six service data packets are sequentially assigned Seq1 to Seq6, so that the six service data packets arrive at the destination node in a transmission sequence of forward probe data packets.

In an embodiment of this disclosure, for processing performed by the source node and the destination node on the probe data packet and the service data packet in addition to assigning the second number to the probe data packet and the service data packet, and processing performed by the transmission node located between the source node and the destination node on the probe data packet and the service data packet, refer to Embodiment 1. Repeated parts are not described again.

Figure 18:
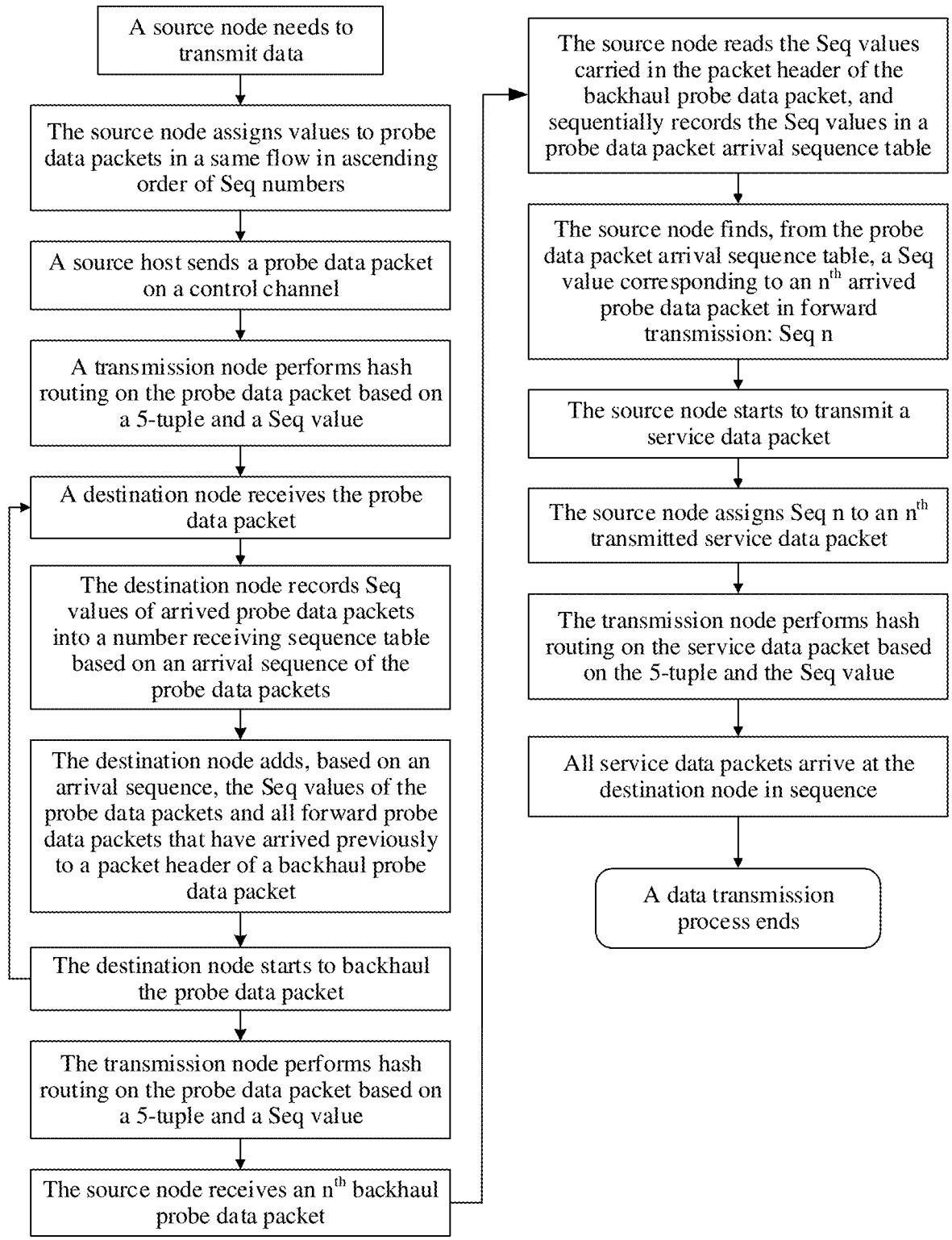
FIG. 18 is a scheduling policy based on a status of an end-to-end transmission path according to an embodiment of this disclosure.

In an embodiment, a core method procedure of a scheduling policy based on an end-to-end transmission path status designed in this disclosure is summarized in FIG. 18. When the source node needs to transmit data, the source node first sends a probe data packet on a control channel (corresponding to a second bandwidth allocated for probe data packet transmission) to detect congestion statuses of a plurality of transmission paths. To ensure that different probe data packets in a same probe data flow are routed and forwarded based on the plurality of transmission paths, the source node assigns ascending values to probe data packet numbers (Seq) in the same probe data flow based on a probe data packet sending sequence. For example, Seq=1 is assigned to a first probe data packet, Seq=2 is assigned to a second probe data packet, and Seq=3 is assigned to a third probe data packet. In addition, in this disclosure, a conventional hash routing method is improved, a number (Seq) value is introduced as a new input parameter, and the transmission node is based on six input parameters in total, including a 5-tuple (i.e., a source IP address, a destination IP address, a source port, a destination port, and a transport layer protocol) and Seq, to calculate a hash result and select an egress port.

After receiving the probe data packet, the destination node reads the Seq value of the probe data packet, and records Seq values of probe data packets that arrive sequentially into the number receiving sequence table in sequence based on an arrival sequence of the probe data packets. Each time the destination node receives a probe data packet, the destination node exchanges a source address of the probe data packet with a destination address of the probe data packet, and transmits the probe data packet back to the source node with a highest priority. By querying the number receiving sequence table, the destination node adds Seq values of a $1^{st}$ to an $n^{th}$ arrived probe data packet to headers of an $n^{th}$ backhaul probe data packet, so that the source node subsequently resolves a disorder problem of the backhauled probe data packets.

After receiving the backhaul probe data packets, the source node reads all Seq values carried in the backhaul probe data packets, and sequentially records the Seq values in the probe data packet arrival sequence table. Each time the source node receives one backhauled probe data packet, the source node sends one service data packet on a data channel (corresponding to a first bandwidth allocated for service data packet transmission). When an $n^{th}$ service data packet is sent, the source node definitely has received n probe data packets, and at least n Seq values have been recorded in the probe data packet arrival sequence table. Therefore, the source node may accurately find, from the probe data packet arrival sequence table, a Seq value Seq n corresponding to the n th arrived probe data packet in forward transmission, and assign a value to the $n^{th}$ service data packet. Because the Seq value is the same as the 5-tuple, the $n^{th}$ service data packet is transmitted to the destination node by using a transmission path that is the same as that of the $n^{th}$ forward probe data packet. In conclusion, it is ensured that the $n^{th}$ service data packet $n^{th}$ arrives at the destination node, that is, all service data packets arrive in sequence, and no additional order-preserving restoration operation at a transport layer is required.

Figure 1:
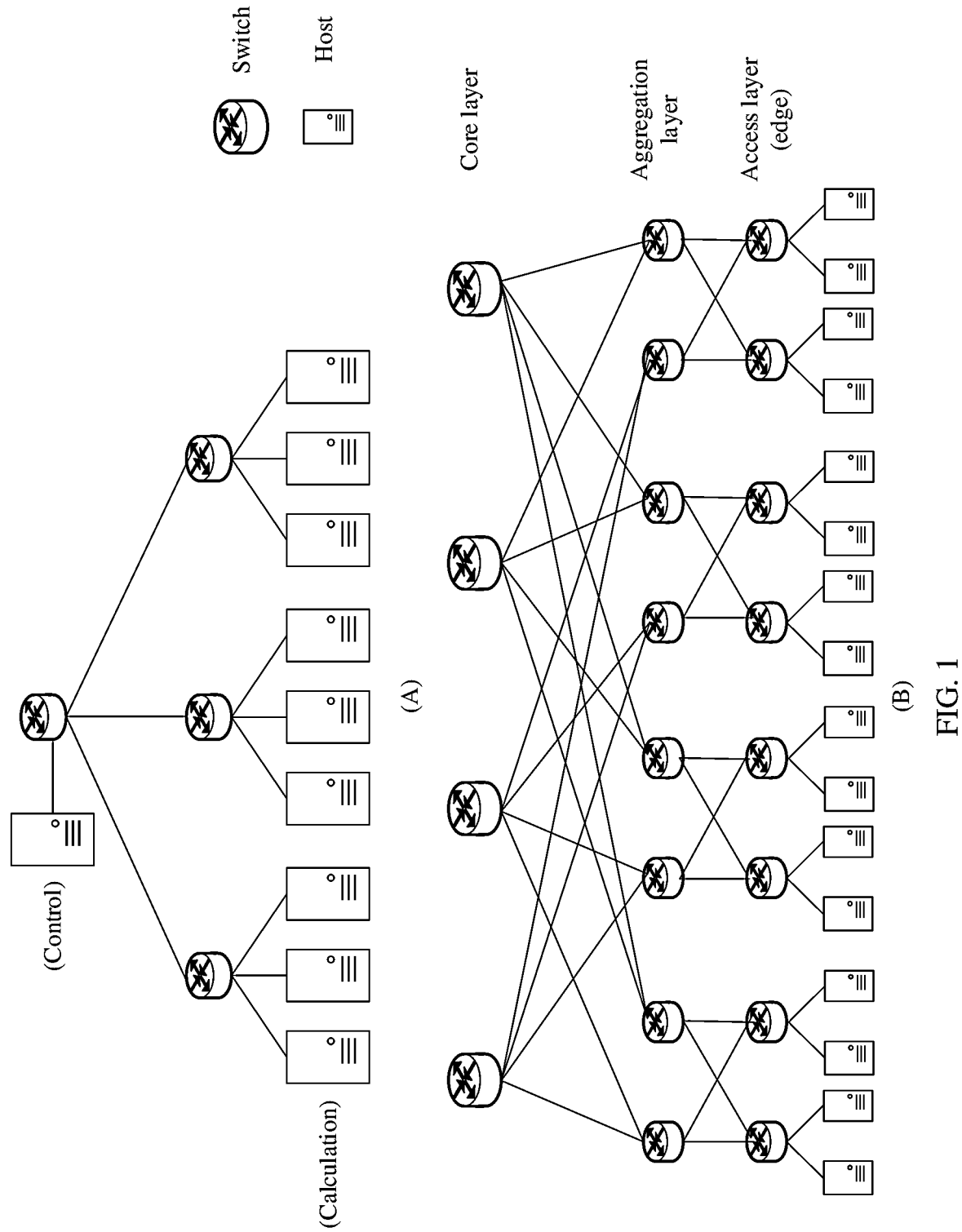
FIG. 1 is a schematic diagram of evolution of a topology architecture of a data center network.
Figure 2:
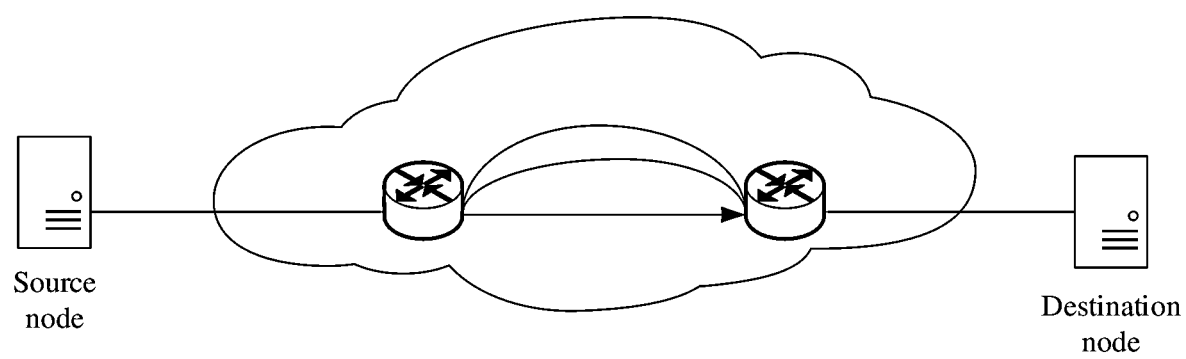
FIG. 2 is a schematic diagram of multipath transmission in a wide area network and a metropolitan area network.

Compared with the technical solution in Embodiment 1, the technical solution in this embodiment focuses on a WAN network scenario in which forward and backhaul paths and traffic distribution are seriously asymmetric. Therefore, the network topology architecture in Embodiment 1 is improved, and an asymmetric network architecture similar to the WAN is constructed. Specifically, an OMNET++ simulation tool is used to randomly select 25% of links in the data center network shown in FIG. 1, and reduce a link bandwidth of the 25% of links from 10 Gbps to 3 Gbps, to construct the asymmetric network architecture similar to the WAN. Then, in the Incast scenario, indicators such as service data transmission completion time (FCT) and a service data packet disorder ratio (Percentage of Disordered Packets) of a network under an effect of this implementation technical solution are evaluated. CONGA, Presto, DRILL, DRB, and conventional ECMP solutions newly proposed in the academic field are all implemented based on an OMNET++ environment in a simulation experiment, and are used as comparison technologies of the technical solutions in this embodiment.

Figure 19:
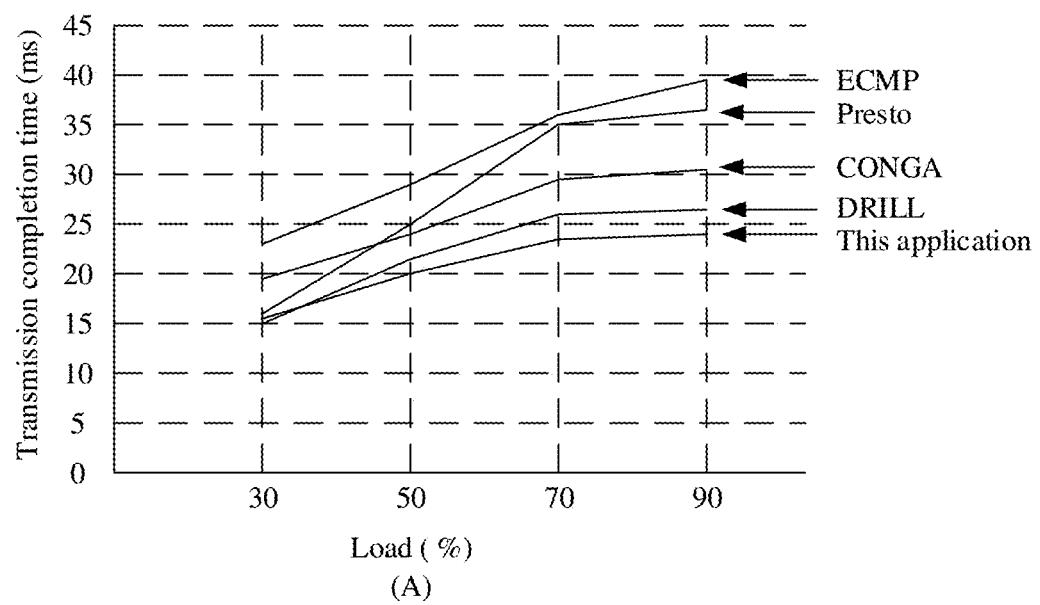
FIG. 19 is a schematic diagram of comparison between data transmission completion time and data packet disorder proportion of networks in different load sharing policies according to an embodiment of this disclosure.
Figure 19:
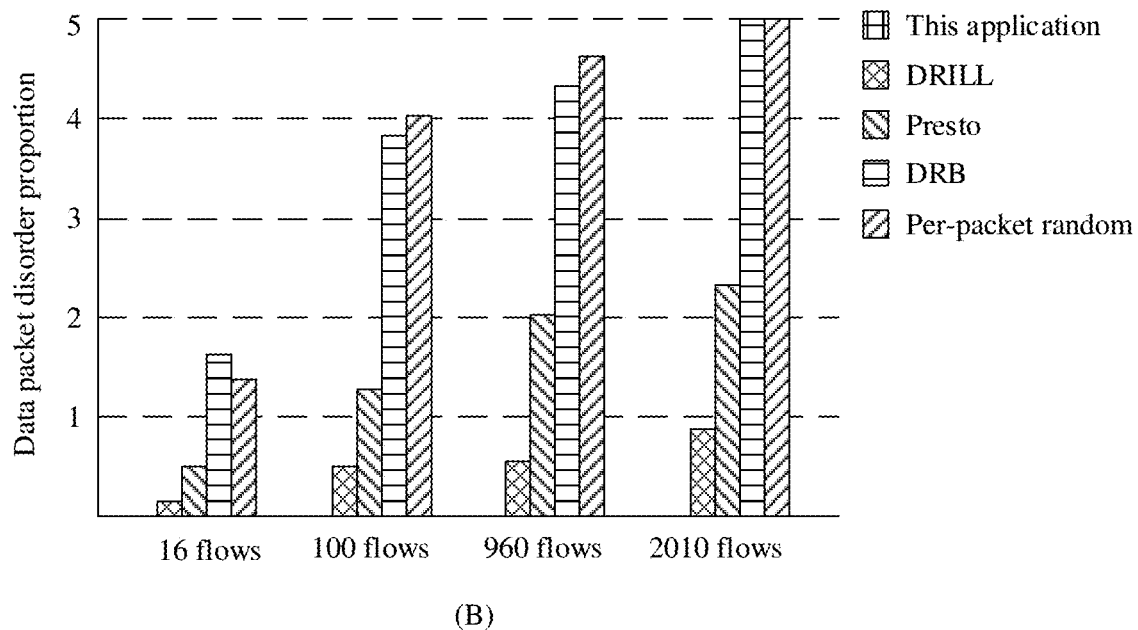

FIG. 19 shows service data transmission completion time (A) and a service data packet disorder ratio (B) in different load balancing solutions. It may be learned from FIG. 19 that, after arrival sequence information of the probe data packets is introduced, the technical solution of this disclosure almost perfectly resolves a data disorder problem. Even in a heavy-load scenario in which 2010 data flows are concurrently transmitted, zero disorder is still successfully maintained in the technical solution of this disclosure. It may be learned from a result in FIG. 19 that, under an effect of a packet-by-packet load sharing solution (DRILL, the solution in this disclosure), overall service data transmission completion time of a network is better than that of a coarse-grained load sharing solution (CONGA, Presto, and ECMP). In addition, compared with the DRILL, the technical solution of this disclosure further resolves the data disorder problem. Therefore, overall performance of the technical solution of this disclosure is better than that of the DRILL.

Then, an unstable network environment is further constructed to test a scheduling effect of the technical solution of this disclosure in a highly dynamic network environment. In the DCN network shown in FIG. 1, two transmission nodes are randomly selected to introduce a 50% packet loss rate to data flows that pass through the two transmission nodes. In this way, a WAN network fault is simulated. In a network fault scenario, performance of the technical solution in this disclosure is further compared with that of the latest load sharing solutions in the field.

Figure 20:
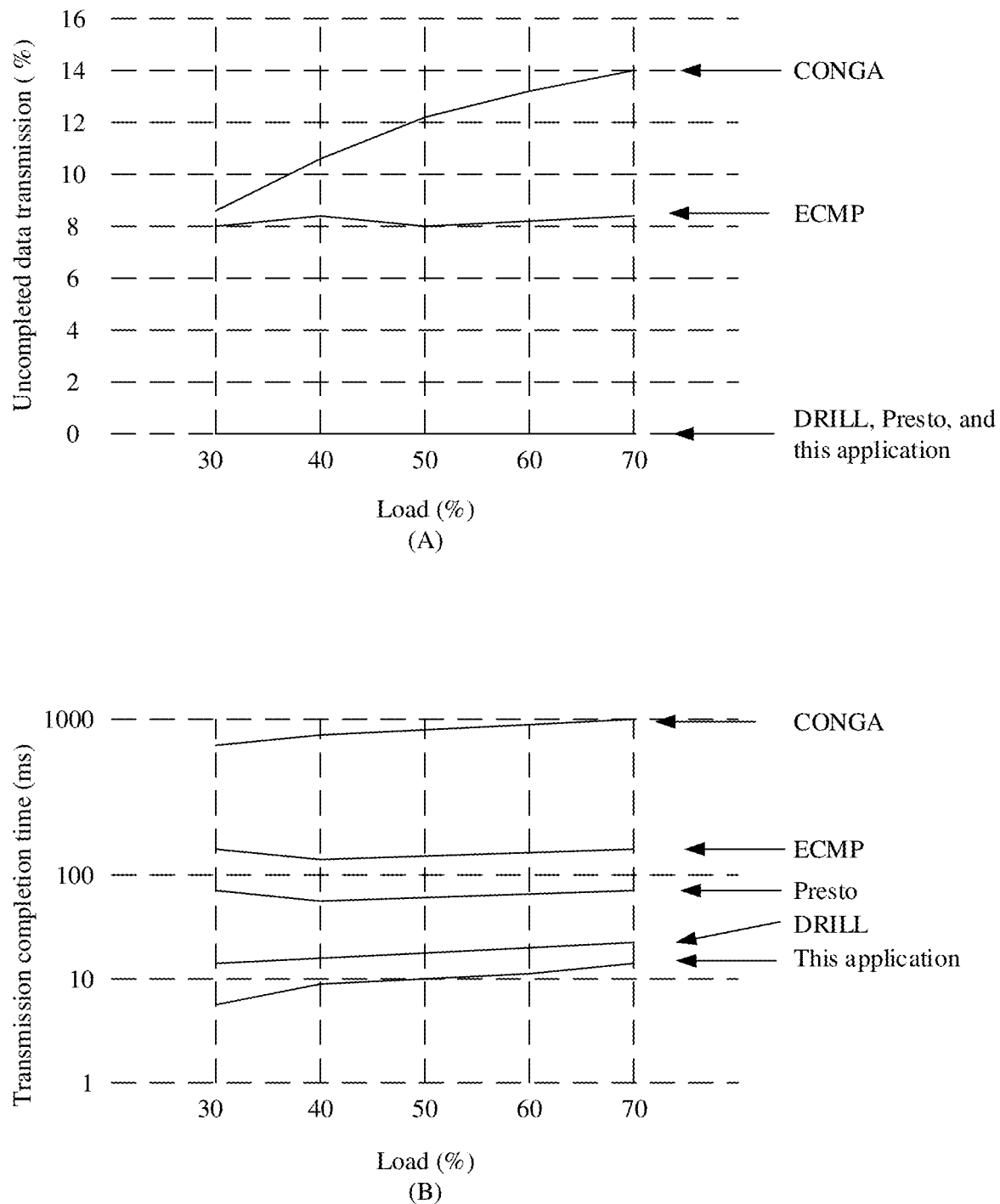
FIG. 20 is a schematic diagram of a network transmission completion rate and transmission completion time under different load sharing solutions in a WAN network fault scenario according to an embodiment of this disclosure.

(A) in FIG. 20 and (B) in FIG. 20 separately compare transmission success rates and transmission completion time of different load sharing methods in a WAN network fault scenario. It may be learned from (A) in FIG. 20 that in the three solutions DRILL, Presto, and this disclosure, a network fault may be successfully sensed, and 100% transmission of all data flows may be ensured under different network load levels. However, a policy that is unaware of a congestion status, such as, ECMP, performs hash routing on a data packet only based on a 5-tuple. As a result, a specific proportion of data is always hashed to a faulty path, therefore, this part of data cannot be successfully transmitted. It is further found from (B) in FIG. 20 that, although the network fault may be successfully sensed in all the three solutions of DRILL, Presto, and this disclosure, transmission completion time of the technical solution of this disclosure is shorter than that of DRILL and Presto. It should be noted that compared with the latest technology in the industry, the solutions of this disclosure can sense a change of a network environment more quickly, and therefore, the solutions of this disclosure are more applicable to a WAN scenario in which a network environment highly dynamically changes.

The foregoing mainly describes the solutions provided in this disclosure from perspectives of the source node, the destination node, and the transmission node. It may be understood that, to implement the foregoing functions, each network element includes a corresponding hardware structure and/or software module (or unit) for performing each function. A person skilled in the art should easily be aware that, in combination with units and algorithm operations of the examples described in embodiments disclosed in this specification, this disclosure may be implemented by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

Figure 21:
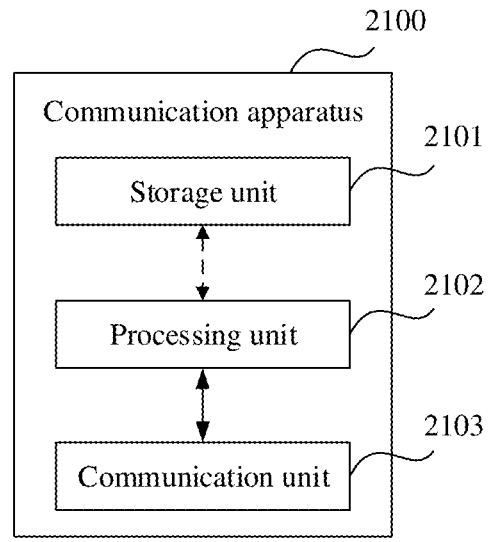
FIG. 21 is a schematic diagram 1 of a structure of a communication apparatus according to an embodiment of this disclosure.

FIG. 21 is a schematic diagram of a structure of a possible communication apparatus according to an embodiment of this disclosure. These communication apparatuses may be configured to implement functions of the source node, the destination node, or the transmission node in the foregoing method embodiments, and therefore can also implement beneficial effects of the foregoing method embodiments. In this embodiment of this disclosure, the communication apparatus may be any source node, any destination node, or any transmission node in FIG. 8 or FIG. 15, or may be a unit (or a module) applied to the source node, the destination node, or the transmission node, or the like.

As shown in FIG. 21. A communication apparatus 2100 may include a processing unit 2102 and a communication unit 2103, and may further include a storage unit 2101. The communication apparatus 2100 is configured to implement a function of the source node, the destination node, or the transmission node in the method embodiment shown in FIG. 8 or FIG. 15.

In an embodiment, the processing unit 2102 is configured to implement a corresponding processing function. The communication unit 2103 is configured to support the communication apparatus 2100 to communicate with another network entity. The storage unit 2101 is configured to store program code and/or data of the communication apparatus 2100. Optionally, the communication unit 2103 may include a receiving unit and/or a sending unit, respectively configured to perform a receiving operation and a sending operation.

When the communication apparatus 2100 is configured to implement a function of the source node in the method embodiment, the processing unit 2102 is configured to assign a first number to a probe data packet in a probe data flow in a sending sequence, where the first number is used to select a transmission path for the probe data packet. The communication unit 2103 is configured to send a probe data packet in the probe data flow to a destination node at a first sending rate. The communication unit 2103 is further configured to send a service data packet in a service data flow each time the communication unit 2103 receives a probe data packet backhauled by the destination node, where the service data packet is assigned a second number corresponding to the probe data packet, and the second number is used to select a transmission path for the service data packet.

When the first number is the same as the second number, the probe data packet to which the first number is assigned and the service data packet to which the second number is assigned correspond to a same transmission path.

In an embodiment, when the communication unit 2103 sends the probe data packet in the probe data flow to the destination node at the first sending rate, the communication unit 2103 is configured to send the probe data packet in the probe data flow to the destination node at the first sending rate in one or more transmission periods.

In an embodiment, the probe data packet backhauled by the destination node carries a number receiving sequence table, and the number receiving sequence table is used by the destination node to record, in a receiving sequence when receiving the probe data packet, a first number of the probe data packet received in a current period. The processing unit 2102 is further configured to: each time the communication unit 2103 receives one probe data packet backhauled by the destination node, update a probe data packet arrival sequence table based on the number receiving sequence table carried in the probe data packet backhauled by the destination node; and record, in the probe data packet arrival sequence table based on a sequence in which a probe data packet arrives at the destination node, a first number of the probe data packet that has arrived at the destination node in the current period.

In an embodiment, the second number is a first number that is determined by the processing unit 2102 in the probe data packet arrival sequence table based on an order of receiving probe data packets backhauled by the destination node in the current period.

In an embodiment, the processing unit 2102 is further configured to adjust the first sending rate based on a packet loss rate of the probe data packet.

In an embodiment, the probe data packet does not include a data domain.

When the communication apparatus 2100 is configured to implement functions of the destination node in the method embodiment, the processing unit 2102 is configured to update a number receiving sequence table each time the communication unit 2103 receives a probe data packet from the source node, where the number receiving sequence table is used to record, based on a receiving sequence, a first number of a probe data packet that has been received in the current period.

The communication unit 2103 is configured to backhaul the probe data packet to the source node, where the backhauled probe data packet carries the number receiving sequence table.

In an embodiment, the probe data packet backhauled to the source node carries information about a highest transmission priority, where a packet loss priority corresponding to the highest transmission priority is the lowest.

In an embodiment, the probe data packet does not include a data domain.

When the communication apparatus 2100 is configured to implement a function of the transmission node in the method embodiment, the communication unit 2103 is configured to receive a data packet, where the data packet carries a number, and the number is used to select a transmission path for the data packet.

The processing unit 2102 is configured to: calculate a hash value based on a source IP address, a destination IP address, a source port, a destination port, a transport-layer protocol, and the number that are corresponding to the data packet; and select, based on the hash value, an egress port corresponding to the hash value to forward the data packet.

In an embodiment, the data packet is a probe data packet or a service data packet.

In an embodiment, the processing unit 2102 is further configured to allocate a first bandwidth to service data packet transmission and allocate a second bandwidth to probe data packet transmission, where the first bandwidth is greater than the second bandwidth.

In an embodiment, a ratio of the second bandwidth to the first bandwidth is a ratio of an average size of the probe data packet to an average size of the service data packet.

In an embodiment, when the probe data packet received by the communication unit 2103 is a forward probe data packet, the communication unit 2103 transmits the forward probe data packet by using the second bandwidth. When the probe data packet received by the communication unit 2103 is a backhaul probe data packet, the communication unit 2103 transmits the backhaul probe data packet by using the first bandwidth. The forward probe data packet is a probe data packet sent by the source node to the destination node, and the backhaul probe data packet is a probe data packet backhauled by the destination node to the source node.

In an embodiment, when a rate at which the communication unit 2103 receives the forward probe data packet is greater than the second bandwidth, the communication unit 2103 discards the forward probe data packet, for example, discards a forward probe data packet that exceeds a transmission capability (the second bandwidth).

In an embodiment, the backhaul probe data packet carries information about a highest transmission priority, and a packet loss priority corresponding to the highest transmission priority is the lowest.

In an embodiment, the probe data packet does not include a data domain.

Figure 22:
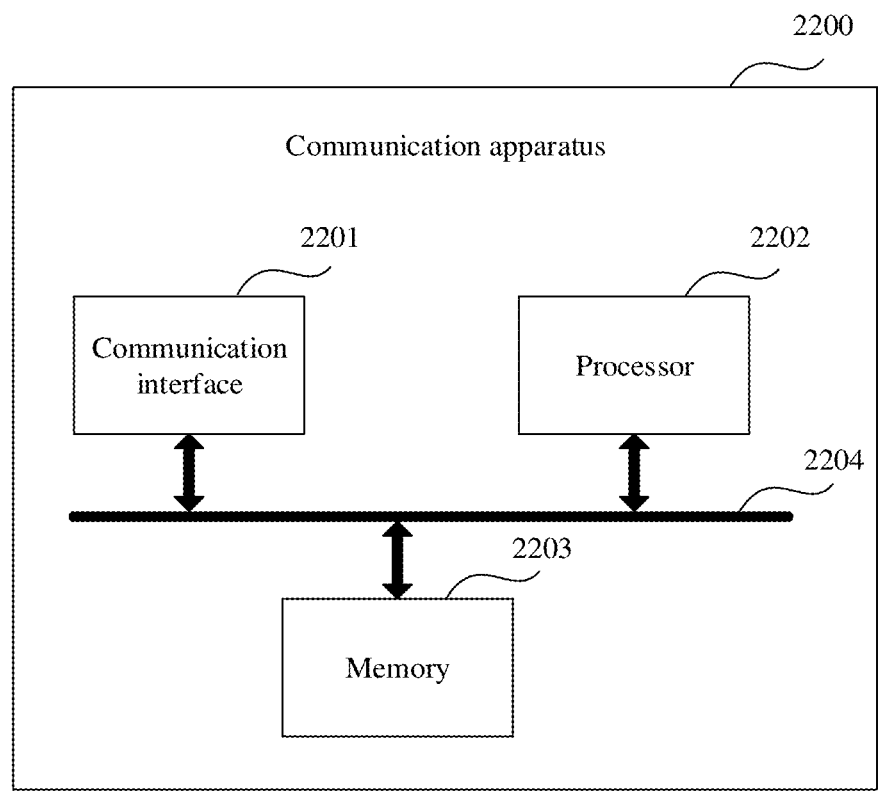
FIG. 22 is a schematic diagram 2 of a structure of a communication apparatus according to an embodiment of this disclosure.

Based on the foregoing embodiments, an embodiment of this disclosure further provides a communication apparatus. Refer to FIG. 22. A communication apparatus 2200 includes a communication interface 2201, a processor 2202, and a memory 2203.

The communication interface 2201, the processor 2202, and the memory 2203 are connected to each other. Optionally, the communication interface 2201, the processor 2202, and the memory 2203 are interconnected by using a bus 2204. The bus 2204 may be a peripheral component interconnect (PCI) bus, an extended industry standard architecture (EISA) bus, or the like. The bus may be classified into an address bus, a data bus, a control bus, and the like. For ease of indication, the bus is indicated by using only one bold line in FIG. 22. However, it does not indicate that there is only one bus or only one type of bus.

When the communication apparatus 2200 implements the communication method applicable to the source node shown in FIG. 8 or FIG. 15, the communication interface 2201 is configured to receive and send data; and the processor 2202 is configured to invoke program instructions stored in the memory to perform the following method:

assigning a first number to a probe data packet in a probe data flow in a sending sequence, where the first number is used to select a transmission path for the probe data packet;

sending the probe data packet in the probe data flow to a destination node at a first sending rate by using the communication interface 2201;

each time a probe data packet backhauled by the destination node is received by using the communication interface 2201, sending a service data packet in a service data flow by using the communication interface 2201, where the service data packet is assigned a second number corresponding to the probe data packet, and the second number is used to select a transmission path for the service data packet; and when the first number is the same as the second number, the probe data packet to which the first number is assigned and the service data packet to which the second number is assigned correspond to a same transmission path.

In an embodiment, the sending the probe data packet in the probe data flow to a destination node at a first sending rate by using the communication interface 2201 includes:

sending the probe data packet in the probe data flow to the destination node at the first sending rate in one or more transmission periods by using the communication interface 2201.

In an embodiment, the probe data packet backhauled by the destination node carries a number receiving sequence table, and the number receiving sequence table is used by the destination node to record, in a receiving sequence when the destination node receives the probe data packet, a first number of a probe data packet that has been received in a current period, and the method further includes:

each time a probe data packet backhauled by the destination node is received by using the communication interface 2201, the communication interface 2201 updates a probe data packet arrival sequence table based on the number receiving sequence table carried in the probe data packet backhauled by the destination node, where the probe data packet arrival sequence table records, based on a sequence in which a probe data packet arrives at the destination node, a first number of the probe data packet that has arrived at the destination node in the current period.

In an embodiment, the second number is a first number that is determined in the probe data packet arrival sequence table based on an order of receiving probe data packets backhauled by the destination node in a current period and that is consistent with the order.

In an embodiment, the method further includes:

adjusting the first sending rate based on a packet loss rate of the probe data packet.

In an embodiment, the probe data packet does not include a data domain.

In another possible embodiment, when the communication apparatus 2200 implements the communication method applicable to the destination node shown in FIG. 8 or FIG. 15, the communication interface 2201 is configured to receive and send data; and the processor 2202 is configured to invoke program instructions stored in the memory to perform the following method:

updating a number receiving sequence table each time the communication interface 2201 receives a probe data packet from the source node, where the number receiving sequence table is used to record, based on a receiving sequence, a first number of a probe data packet that has been received in a current period; and backhauling the probe data packet to the source node by using the communication interface 2201, where the backhauled probe data packet carries the number receiving sequence table.

In an embodiment, the probe data packet backhauled by the destination node to the source node carries information about a highest transmission priority, where a packet loss priority corresponding to the highest transmission priority is the lowest.

In an embodiment, the probe data packet does not include a data domain (e.g., payload).

In another possible embodiment, when the communication apparatus 2200 implements the communication method applicable to the transmission node shown in FIG. 8 or FIG. 15, the communication interface 2201 is configured to receive and send data; and the processor 2202 is configured to invoke program instructions stored in the memory to perform the following method:

receiving a data packet by using the communication interface 2201, where the data packet carries a number, and the number is used to select a transmission path for the data packet;

calculating a hash value based on a source IP address, a destination IP address, a source port, a destination port, a transport-layer protocol, and the number that are corresponding to the data packet; and selecting, based on the hash value, an egress port corresponding to the hash value to forward the data packet.

In an embodiment, the data packet is a probe data packet or a service data packet.

In an embodiment, the method further includes:

allocating a first bandwidth for service data packet transmission and allocating a second bandwidth for probe data packet transmission, where the first bandwidth is greater than the second bandwidth.

In an embodiment, a ratio of the second bandwidth to the first bandwidth is a ratio of an average size of the probe data packet to an average size of the service data packet.

In an embodiment, when the probe data packet received by using the communication interface 2201 is a forward probe data packet, the forward probe data packet is transmitted by using the second bandwidth. When the probe data packet received by using the communication interface 2201 is a backhaul probe data packet, the backhaul probe data packet is transmitted by using the first bandwidth, where the forward probe data packet is a probe data packet sent by the source node to the destination node, and the backhaul probe data packet is a probe data packet backhauled by the destination node to the source node.

In an embodiment, when a rate at which the forward probe data packet is received by using the communication interface 2201 is greater than the second bandwidth, the forward probe data packet is discarded, for example, a forward probe data packet that exceeds a transmission capability (the second bandwidth) is discarded.

In an embodiment, the backhaul probe data packet carries information about a highest transmission priority, and a packet loss priority corresponding to the highest transmission priority is the lowest.

In an embodiment, the probe data packet does not include a data domain.

In another form of this embodiment, a computer-readable storage medium is provided. The computer-readable storage medium stores instructions. When the instructions are executed, the method applicable to the source node, the destination node, or the transmission node in the foregoing method embodiments may be performed.

In another form of this embodiment, a computer program product including instructions is provided. When the instructions are executed, the method applicable to the source node, the destination node, or the transmission node in the foregoing method embodiments may be performed.

In another form of this embodiment, a chip is provided. When running, the chip may perform the method applicable to the source node, the destination node, or the transmission node in the foregoing method embodiments.

In this embodiment of this disclosure, the processor may be a general-purpose processor, a digital signal processor, an application-specific integrated circuit, a field programmable gate array or another programmable logic device, a discrete gate or transistor logic device, or a discrete hardware component. The processor may implement or execute the methods, operations, and logical block diagrams disclosed in embodiments of this disclosure. The general-purpose processor may be a microprocessor or any conventional processor or the like. The operations of the method disclosed with reference to embodiments of this disclosure may be directly performed by a hardware processor, or may be performed by using a combination of hardware and software modules in the processor.

In embodiments of this disclosure, the memory may be a nonvolatile memory, for example, a hard disk drive (HDD) or a solid-state drive (SSD), or may be a volatile memory such as a random access memory (RAM). The memory is any other medium that can be used to carry or store expected program code in a form of instructions or a data structure and that can be accessed by a computer. However, this is not limited thereto. The memory in embodiments of this disclosure may alternatively be a circuit or any other apparatus that can implement a storage function, and is configured to store program instructions and/or data.

All or some of the methods provided in embodiments of this disclosure may be implemented by using software, hardware, firmware, or any combination thereof When the embodiments are implemented by using software, all or some of the embodiments may be implemented in a form of a computer program product. The computer program product includes one or more computer instructions. When the computer program instructions are loaded and executed on a computer, all or some of the procedures or functions according to embodiments of this disclosure are generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium, or the like.

In embodiments of this disclosure, on the premise that there is no logical conflict, embodiments may be mutually referenced. For example, methods and/or terms in the method embodiments may be mutually referenced, and functions and/or terms in the apparatus embodiments may be mutually referenced, for example, functions and/or terms between the apparatus embodiments and the method embodiments may be mutually referenced.

It is clear that a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A communication method, comprising: assigning, by a source node, a first number to a probe data packet in a probe data flow in a sending sequence, wherein the first number is used to select a transmission path for the probe data packet; sending, by the source node, the probe data packet in the probe data flow to a destination node at a first sending rate, further comprising: sending the probe data packet in the probe data flow to the destination node at the first sending rate in one or more transmission periods; and each time in response to receiving a probe data packet backhauled by the destination node, sending, by the source node, a service data packet in a service data flow, wherein the service data packet is assigned a second number corresponding to the probe data packet, and the second number is used to select a transmission path for the service data packet, wherein when the first number is the same as the second number, the probe data packet to which the first number is assigned and the service data packet to which the second number is assigned correspond to a same transmission path.

2. The method according to claim 1, wherein the probe data packet backhauled by the destination node carries a number receiving sequence table that is used by the destination node to record a first number of the probe data packet that has been received in a current period, wherein the method further comprises:

each time in response to receiving a probe data packet backhauled by the destination node, updating, by the source node, a probe data packet arrival sequence table based on the number receiving sequence table carried in the probe data packet backhauled by the destination node, wherein the probe data packet arrival sequence table records, based on a sequence in which a probe data packet arrives at the destination node, a first number of the probe data packet that has arrived at the destination node in the current period.

3. The method according to claim 2, wherein the second number is a first number that is determined by the source node in the probe data packet arrival sequence table based on an order of receiving probe data packets backhauled by the destination node in a current period and that is consistent with the order.

4. The method according to claim 1, further comprising:
adjusting, by the source node, the first sending rate based on a packet loss rate of the probe data packet.

5. The method according to claim 1, wherein the probe data packet does not comprise a data domain.

6. A communication method, comprising: receiving, by a transmission node, a data packet, wherein the data packet carries a number that is used to select a transmission path for the data packet; calculating, by the transmission node, a hash value based on a source Internet protocol (IP) address, a destination IP address, a source port, a destination port, a transport-layer protocol, and the number that are corresponding to the data packet; selecting, by the transmission node, based on the hash value, an egress port corresponding to the hash value to forward the data packet, wherein the data packet is a probe data packet or a service data packet; and transmitting, by the transmission node, a forward probe data packet using a second allocated bandwidth; or transmitting, by the transmission node, a backhaul probe data packet using a first allocated bandwidth; wherein the forward probe data packet is a probe data packet sent by a source node to a destination node, and the backhaul probe data packet is a probe data packet backhauled by the destination node to the source node.

7. The method according to claim 6, wherein a ratio of the second bandwidth to the first bandwidth represents a ratio of an average size of probe data packets to an average size of service data packets.

8. The method according to claim 6, further comprising:
discarding, by the transmission node, the forward probe data packet when a rate at which the transmission node receives the forward probe data packet is greater than the second bandwidth.

9. The method according to claim 6, wherein the backhaul probe data packet carries information about a highest transmission priority, and a packet loss priority corresponding to the highest transmission priority is the lowest.

10. The method according to claim 6, wherein the probe data packet does not comprise a data domain.

11. The method according to claim 6, further comprising: allocating, by the transmission node, the first bandwidth to service data packet transmission; and allocating the second bandwidth to probe data packet transmission, wherein the first bandwidth is greater than the second bandwidth.

* * * * *